(12) United States Patent
Feichtinger et al.

(10) Patent No.: US 7,912,672 B2
(45) Date of Patent: Mar. 22, 2011

(54) METHOD AND DEVICE FOR EVALUATING DISPLACEMENT SIGNALS

(75) Inventors: Richard Feichtinger, Tuebingen (DE); Jürgen Löschinger, Tuebingen (DE)

(73) Assignee: Humotion GmBh, Tuebingen (DE)

( * ) Notice: Subject to any disclaimer, the term of this patent is extended or adjusted under 35 U.S.C. 154(b) by 231 days.

(21) Appl. No.: 11/795,828

(22) PCT Filed: Jan. 19, 2006

(86) PCT No.: PCT/EP2006/000423
§ 371 (c)(1),
(2), (4) Date: Jul. 23, 2007

(87) PCT Pub. No.: WO2006/077104
PCT Pub. Date: Jul. 27, 2006

(65) Prior Publication Data
US 2008/0133171 A1    Jun. 5, 2008

(30) Foreign Application Priority Data

Jan. 21, 2005 (DE) .......................... 10 2005 004 086

(51) Int. Cl.
*G01P 15/00* (2006.01)
(52) U.S. Cl. ..................................... 702/150
(58) Field of Classification Search ................. 702/150
See application file for complete search history.

(56) References Cited

U.S. PATENT DOCUMENTS

| 5,181,181 A | 1/1993 | Glynn |
| 6,305,221 B1 | 10/2001 | Hutchings |
| 6,513,381 B2 | 2/2003 | Fyfe et al. |
| 6,658,292 B2 | 12/2003 | Kroll et al. |
| 2003/0014210 A1 | 1/2003 | Vock et al. |

FOREIGN PATENT DOCUMENTS

WO     WO 2004/072579      8/2004

OTHER PUBLICATIONS

W. Sun, W. Li, and Y, Xu, A MUMPs angular-position and angular-speed sensor with off chip wireless transmission, microsystem technology, 2001, p. 63-70.*
Notification of Transmittal of Translation of the International Preliminary Report on Patentability dated Aug. 6, 2007 issued in corresponding application No. PCT/EP2006/000423.
Hansson G-A et al., "Validity and reliability of traxial accelerometers for inclinometry in posture analysis", Medical and Biological Engineering and Computing, Peter Peregrinus Ltd., vol. 39, No. 4, Jul. 2001, pp. 405-413.

* cited by examiner

*Primary Examiner* — Tung S Lau
(74) *Attorney, Agent, or Firm* — Cohen Pontani Lieberman & Pavane LLP

(57) ABSTRACT

A process for evaluating motion signals in three-dimensional space is disclosed. The process includes obtaining a first initial measurement value in a first initial direction which is also a first desired direction; obtaining a second initial measurement value in a second initial direction which is different from the first initial direction; calculating a second desired direction and a second determined value from the first and second initial measurement values, the second desired direction being different from the first and second initial directions; calculating a third desired direction and a third determined value from the first initial measurement value and the second determined value, the third desired direction being different from the first and second desired directions; and converting the first initial measurement value, the second and third determined values into respective first, second and third acceleration values. A device for implementing this process is also disclosed.

13 Claims, 19 Drawing Sheets

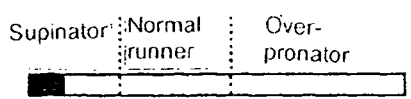 
Fig. 13a
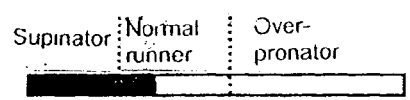 
Fig. 13b
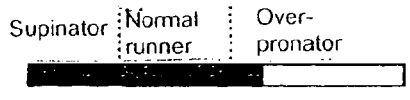 
Fig. 13c
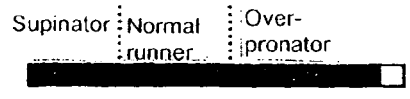 
Fig. 13d

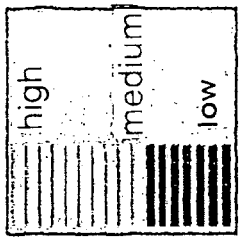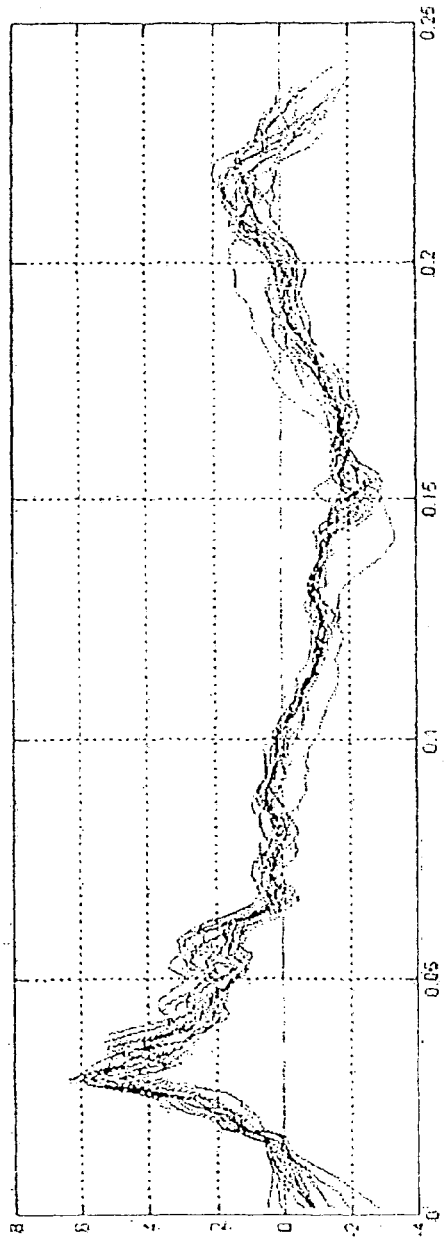
Fig. 14a
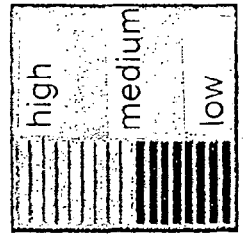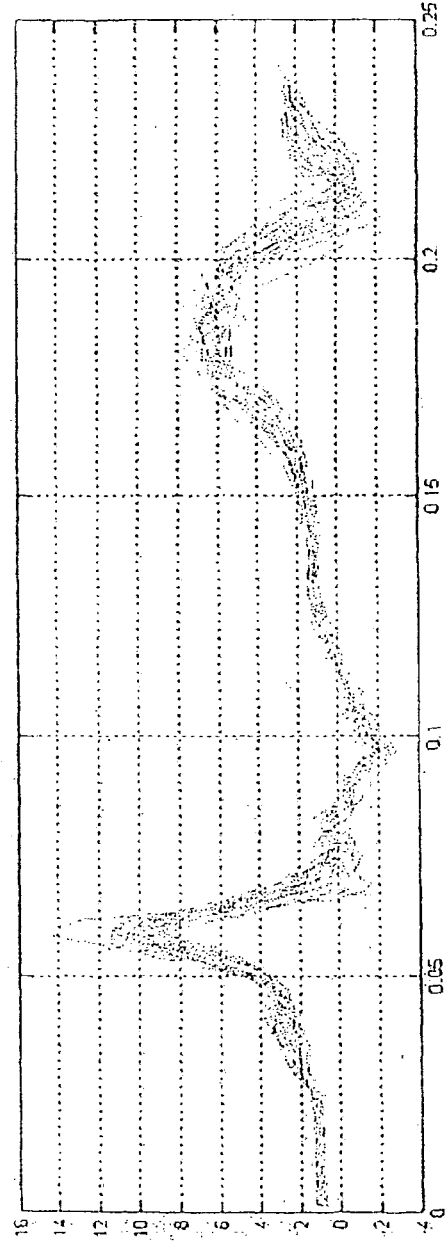
Fig. 14b

US 7,912,672 B2

METHOD AND DEVICE FOR EVALUATING DISPLACEMENT SIGNALS

CROSS-REFERENCE TO RELATED APPLICATIONS

This is a U.S. national stage of International Application No. PCT/EP2006/000423, filed on 18 Jan. 2006. Priority is claimed on German Application No. 10 2005 004 086.1, filed on 21 Jan. 2005.

BACKGROUND OF THE INVENTION

1. Field of the Invention

The invention relates to a process for evaluating motion signals in three-dimensional space and to a device for implementing the process.

The problems of the conventional processes described below are solved by a process for evaluating motion signals in three-dimensional space by using at least three acceleration sensors. The process includes the steps of obtaining a first initial measurement value in a first initial direction in space, the first initial measurement value being a first determined value, the first initial direction being a first desired direction in space; obtaining a second initial measurement value in a second initial direction in space, the second initial direction being different from the first initial direction; calculating a second desired direction in space and a second determined value from the first initial measurement value and the second initial measurement value, the second desired direction being different from each of the first initial direction and the second initial direction; calculating a third desired direction in space and a third determined value from the first initial measurement value and the second determined value, the third desired direction being different from each of the first desired direction and the second desired direction; and converting the first determined value, the second determined value and the third determined value into a first acceleration value in the first desired direction, a second acceleration value in the second desired direction and a third acceleration value in the third desired direction, respectively. The problems of the conventional devices described below are solved by a device for evaluating motion signals in three-dimensional space. The device includes a carrier element, and at least one of an acceleration sensor and a rotational angle/speed sensor. The at least one of an acceleration sensor and a rotational angle/speed sensor is attached to the carrier element.

The invention relates to a device for measuring motion. The device detects motion in space by means of several motion sensors. The measurement values for at least one direction of motion are processed together with the measurement values for at least one other direction of motion. An angular velocity measurement is combined with a linear acceleration measurement. Three linear acceleration measurements are combined to convert the accelerations into three corrected directions in space. A transformation of this type is useful when it is difficult to attach the sensors so that they are aligned with the directions in space to be measured, which is true especially in the case of measurements on the human body. According to the present process, the acceleration sensors can be attached anywhere; the desired directions are determined on the basis of two initial positions.

2. Description of the Related Art

The gait cycle during a stride is a complex process. The feet are highly complicated structures, each consisting of 26 bones and 31 joints, and they not only carry the human body but also provide elastic suspension for it when shocks occur during walking. They also hold us in a state of balance and sense irregularities in the ground. One feature of the human gait cycle is pronation, which is the inward rotation of the ankle during the gait cycle. Overpronation, that is, too much pronation, is often associated with complaints by runners. Many running shoes are therefore offered with medial supports, which are intended to prevent excessive pronation. Conversely, the use of a pronation support is inappropriate in the presence of underpronation (supination) and is considered a cause of complaints in its own right. Various aids and devices are therefore used to measure pronation in athletes.

Video analysis is often used as a basis for offering advice about running shoes. The customer is recorded by a video system as he is running on a treadmill. The video is then played back at very slow speed. The more-or-less normal pronation movement of the foot as it makes contact can be seen. Because this movement is easy to recognize and because excessive pronation can lead to complaints, the shoe which is recommended is the one with which the customer shows the least pronation.

Measurement on the treadmill suffers from several disadvantages: First, the required equipment is expensive and occupies a great deal of space. Second, running on a treadmill is not easy and changes the runner's normal running style. In any case, inexperienced customers require full attention. Third, the method itself is highly controversial on scientific grounds because of its inaccuracy. Fourth, the normal pronation movement, which is important for good health, is often overcompensated. Nevertheless, this method is widely used in stores specializing in running shoes.

There are also a few systems which detect the motion of the bare foot as it makes contact with pressure-measuring plates. This dynamic measuring method confronts the user with an additional difficulty, namely, the difficulty of stepping on the relatively small measuring platform at all while making a normal stride. Pressure-measuring plates are also relatively expensive, and a reliable evaluation of the pressure data can be accomplished only by sports scientists.

The company Currex offers a software program called "MotionQuest" to help with the selection of shoes. After various biomechanical data have been entered, the program searches a database for a suitable shoe. The MotionQube Station from Currex makes it easier to enter the data by the use of a scanner. This technology with a scanner is also offered by Rothballer.

Scanners are also sold with a different type of software, which takes into account only the shape of the sole. This program is sold under the name "FootPrint" by Schmitzl Systems and is also used at Runners Point. Many specialty shops arrange "campaign days", in which measurement systems from certain shoe manufacturers (for example, the Footscan System from Adidas or scanners from Asics) are used.

SUMMARY OF THE INVENTION

The system described here makes it possible to conduct a dynamic measurement while the runner is actually running. In comparison with widespread video analysis, the system offers the advantage of automatically measuring many strides with high temporal resolution and of averaging them, so that the results can be delivered directly as a shoe recommendation. Above all, however, it can also be used without a treadmill.

The invention is described on the basis of a device for measuring runners' motions, but it is also suitable for a many other types of motion measurement. Nor is it limited to applications to human beings. For example, 4 sensor units can be attached to the ankles of animals such as horses to document and to analyze their gait.

With the technology of the "polysilicon surface micromachined sensors", small and lightweight motion sensors are available at low cost. Thus a large number of applications involving motion analysis have now become possible. For example, athletes use devices which calculate speed and distance on the basis of foot acceleration measurements. Patients use devices with acceleration sensors to determine their activity and body position. Devices exist, for example, which are used to monitor patients and to alert nurses, for example, in the case of a fall or collapse. Other devices such as heart pacemakers or artificial hearts can quickly adapt cardiac output as needed on the basis of acceleration values. Some heart rate measuring devices are based on the principle of photoplethysmography and use motion sensors to correct the motion artifacts which would otherwise interfere with the results.

For interpretation, acceleration values are usually broken down into their components representing three orthogonal directions in space. In applications involving humans, the three directions are usually identified with the anatomical-physiological directions forward/backward, left/right, and up/down. Up/down is usually defined as the direction in which the force of Earth's gravity acts.

Integrated circuits (IC's) with acceleration sensors are either already designed and built to measure accelerations in three spatial directions orthogonal to each other, or, if they are designed and built to measure only one or two spatial directions, they can be easily connected mechanically to each other in such a way that accelerations in all three orthogonal directions in space can be measured with three or two of these IC's. In the following, a sensor unit which can measure accelerations in all three orthogonal spatial directions is called a "3D acceleration sensor" or a "3D sensor", regardless of whether it is an IC or a mechanically assembled unit consisting of several IC's.

Rotational angle sensors detect the rotational speed around a single axis of rotation, which is usually perpendicular to the plane of the flat housing of the IC.

In practice, it is often difficult to attach 3D acceleration sensors to, for example, a human being in such a way that that the directions of the measured accelerations correspond to the anatomical-physiological directions.

First, the advantage offered by "polysilicon surface micromachined sensors", namely, that they are small and lightweight and thus have hardly any influence on the measurement result and can also be attached inconspicuously, brings with it the problem that 3D acceleration sensors which are only a few millimeters in size are difficult, without technical aids, to orient precisely in the desired spatial directions.

Second, it is important for a useful measurement that the 3D acceleration sensors be attached at properly selected points, that is, to places on the body where, for example, bony structures are close to the surface of the skin, that is, to places which are covered by only thin layers of muscle or fat or by no such layers at all. These locations themselves, however, are not usually oriented in the desired directions. For example, the surface of the shin bone slants in a forward-medial direction, and the instep slants forward and down. Many good locations, furthermore, are round surfaces, such as the ankles, and therefore do not clearly define a direction for the attachment of a 3D acceleration sensor.

Third, the attachment of the individual 3D acceleration sensors, especially to well selected locations on the human body, is highly dependent on the individual anatomical situation, on the circumstances at the time in question, and on chance. For example, in the case of heart rate measurements on the ear, the orientation of a motion-corrected photoplethysmographlic sensor depends on the individual attachment to the ear and is almost impossible to predict. In many situations, such as during the surgical placement of a heart pacemaker or artificial heart, it is also desirable not to have to worry about its orientation in space.

The difficulties in attaching 3D acceleration sensors become clear in the case of the method of Lafortune and Hennig. To solve the problem, these researchers connected the 3D acceleration sensors to a hand-sized mechanical structure. (M. A. Lafortune & E. M. Hennig, Med. Sci. Sports & Exerc., 23(3), 360-363, 1991, FIG. 1 and M. A. Lafortune, J. Biomechanics, 24(10), 877-886, 1991, FIG. 1). After attachment to the leg of the test subject, the actual positions of the 3D acceleration sensors with respect to the shin bone of the test subject were determined from photographs in two measured orthogonal directions. The values measured by the 3D acceleration sensors were then converted on the basis of the positional relationships determined from the photographs into acceleration values in the three desired directions in space relative to the shin bone.

With the inventive device described here, the acceleration sensors can be attached anywhere. Three linear acceleration measurements are combined to convert accelerations measured in more-or-less random directions into three corrected directions in space. The conversion is performed automatically. The desired directions are determined on the basis of two initial positions by means of a process described here. A transformation of this type is useful when it is difficult to attach the sensors so that they are aligned with the spatial directions to be measured, which is especially true in the case of measurements on the human body.

BRIEF DESCRIPTION OF THE DRAWINGS

FIGS. 13a to 13d show how different shoes are chosen in accordance with different running styles;

FIG. 14a shows the angular velocity as measured by a rotational speed sensor;

FIG. 14b shows the time change in the vertical acceleration of the leg;

DETAILED DESCRIPTION OF THE PREFERRED EMBODIMENTS

The device described here measures the motions of the test subject, such as those of a customer in a running shoe store, to obtain information on the extent of his pronation. The measurement values are automatically evaluated in a data processing system, and a type of shoe recommended for the customer is displayed.

Figure 1:
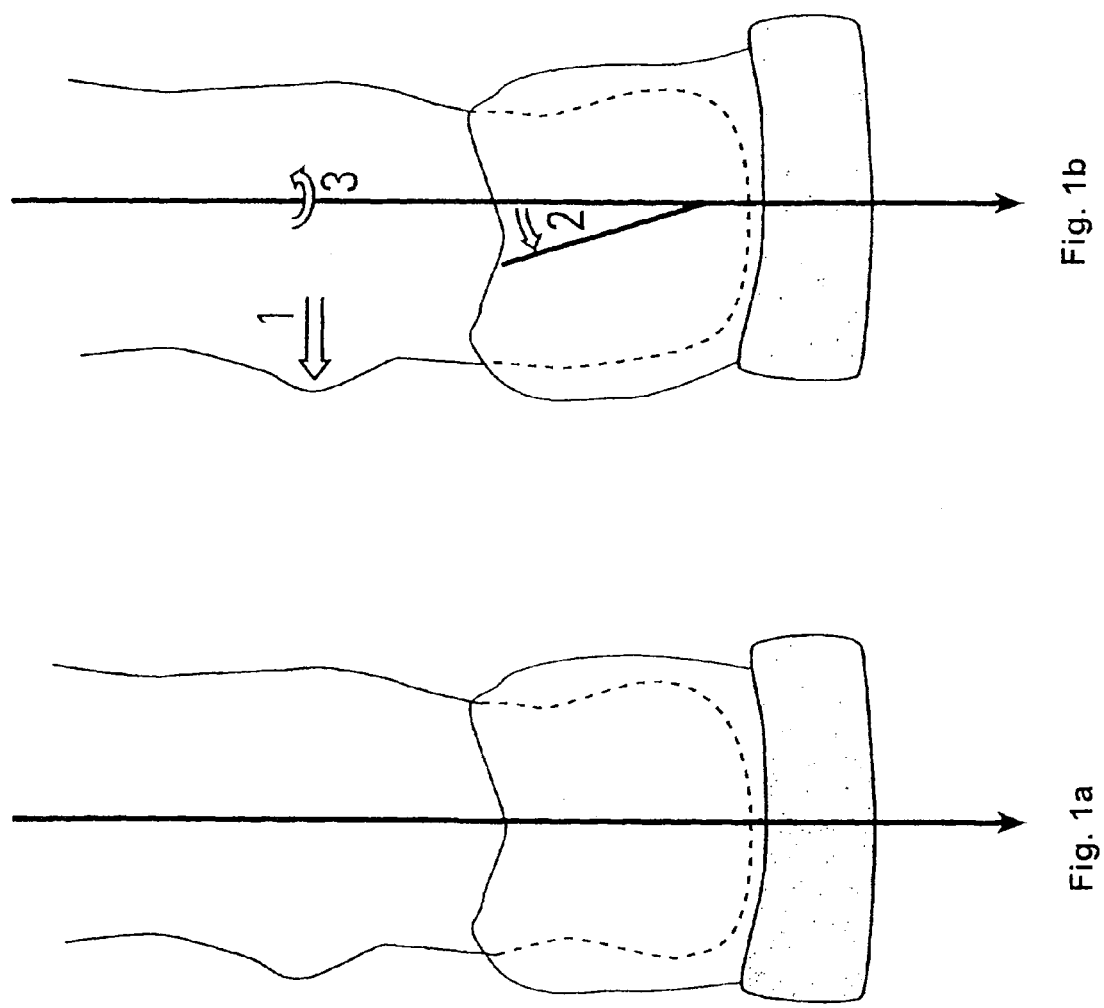
FIG. 1a is a schematic view of a foot of a person.
FIG. 1b is another schematic view of the foot.

To obtain the pronation data, three measurement sites (1, 2, 3 in FIG. 1*b*) have proven reliable, which can be used together or each on its own. In addition to pronation, which represents a rotation around the slanted axis of the ankle, the ankle also undergoes a lateral motion (1 in FIG. 1*b*), a rotation of the heel bone, a rotation of the heel cap of the shoe (2 in FIG. 1*b*), and a rotation of the shin bone (3 in FIG. 1*b*).

Figure 2:
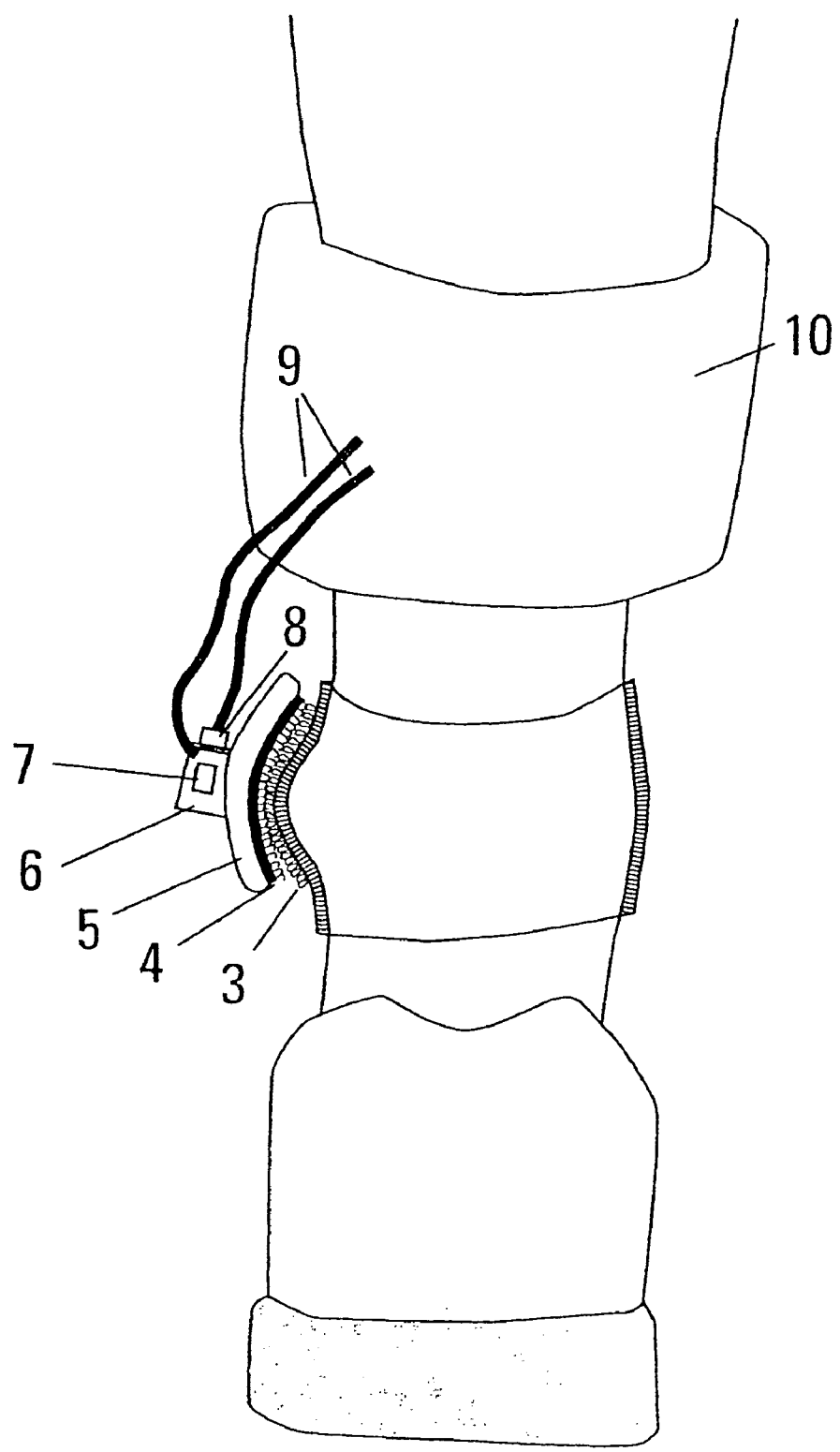
FIG. 2 is a schematic view, showing an embodiment of the device of the present invention and how the device is attached to the foot.

FIG. 2 shows a 3D acceleration sensor attached to the ankle to measure its lateral motion during pronation. An elastic fleece strap 3 is put around the leg with the fleece side facing the leg. A Velcro strip 4 is glued to the concave inside surface of a plastic shell 5. A 3D acceleration sensor, which, in the version shown in FIG. 2, consists of two 2D acceleration sensors 7, 8, which are attached to the surfaces of a plastic cube 6 in such a way that they are at a right angle to each other, is attached to the convex outside surface of the plastic shell 5. The sensors 7, 8 are connected by a cable 9 to an electronic recorder, which is installed in a cuff 10.

The permanently connected unit consisting of the sensors 7, 8, the plastic cube 6, and the plastic shell 5 with the Velcro strap 4, is simply placed on the ankle covered by the fleece strap 3.

The process of the invention makes it possible to attach 3D acceleration sensors to selected locations with any desired orientation. The advantages of the smallness and light weight of microchip sensors remain almost completely preserved and are not compromised by housings, the design of which would have to take into account the alignment of the sensors. Instead, the coordinates are subjected to a mathematical transformation, which can be accomplished immediately by microprocessors, which means that a transformation is carried out for each original measurement value consisting of three directional components.

The coordinate transformation is accomplished on the basis of initial values, which are determined from the values of two initial measurements. These two initial measurements are made with the 3D acceleration sensor in situ, that is, in the position which it actually occupies in each individual case.

The values of the two initial measurements remain valid as long as the 3D acceleration sensor remains in its original position relative to the measured object. The two initial measurements must be made again if the 3D acceleration sensor has changed its orientation relative to the measured object, which can happen, for example, when it is removed and then reattached.

It is not sufficient to perform only a single initial measurement. The information derived from a single initial measurement is, indeed, sufficient to calculate the acceleration component of a single direction in space, such as the vertical direction, as described in U.S. Pat. No. 6,658,292. The information derived from a single initial measurement, however, is not sufficient to calculate the components of one or both of the other desired directions—at least not without an additional assumption, such as that one of the other desired directions is in a fixed spatial relationship to one of the original directions. An additional assumption of this type is made, for example, in the method described in Equations 34-49 of U.S. Pat. No. 6,305,221 for transforming a reference coordinate system into a coordinate system aligned with the force of gravity. In that method, it is explicitly assumed between Equation 35 and Equation 36 that zg, xg, and x lie in a plane and that therefore the desired direction xg is in a fixed relationship to the original direction x. Precisely in the case of a more-or-less random attachment of a 3D acceleration sensor, however, an additional assumption of this type is not possible or desirable, nor is it necessary for the process of the present invention. Without such an additional assumption of a fixed relationship of a desired direction in space to an original direction in space, it is possible to calculate the acceleration component of a second desired direction in space only after making a second initial measurement.

Two initial measurements are also sufficient to calculate the acceleration components for all three desired directions in space, insofar as the three desired directions are in a fixed relationship to each other (or to the directions of the two initial measurements), which is true when, for example, all three desired directions are orthogonal to each other.

The coordinate transformation of acceleration values measured in three directions of space into three other desired directions in space corresponds to the mathematical coordinate transformation in vector space. In matrix notation, $$R = B^{-1} * A \qquad [1]$$

where R is the vector of the transformed acceleration values in the three desired directions; A is the vector of the acceleration values in the three original directions, * is the matrix multiplier, and $B^{-1}$ is the inverse of matrix B, where B is formed from the base values of the desired directions (R1, R2, R3 in FIGS. 3 and 4) in the coordinate system of the original directions (A1, A2, A3 in FIGS. 5 and 6). The coordinate transformation is thus completely described when a method is given which specifies how matrix B is to be determined. Insofar as Cartesian coordinate systems are used, that is, insofar as the three directions are formed by unity vectors which are orthogonal to each other in pairs, $B^{-1} = BT$, that is, the inverse matrix is equal to the transposed matrix.

The process of the invention, namely, how the values of matrix B are determined for a coordinate transformation from two initial measurements is described in the following on the basis of a special example.

The device described by way of example uses 2D acceleration sensors from Analog Devices, ADXL210E, which can be read out in both digital and analog fashion. Both possible readouts lead to comparable results within the scope of the selected application, namely, the determination of acceleration components in the lateral, frontal, and vertical directions at the ankles of joggers. In addition to dynamic accelerations, these sensors also measure static accelerations, especially the force of gravity. Without loss of general validity, it is assumed for this example that the static and dynamic accelerations are read out as analog values.

The analog voltage signal was digitized (4 times per measurement value and averaged). The acceleration sensors were calibrated individually for each direction according to the manufacturer's instructions. The signal was measured at +1 g and −1 g, and from that the stroke (half the difference) and the zero point (the mean value) were determined. Two small circuit boards, each about 1 cm$^2$ in size and each carrying a 2D acceleration sensor 7, 8, are glued at an angle of 90° to each other to a support cube 6, so that a 3D acceleration sensor is obtained, from which values for three orthogonal directions can be read out and which is normalized to 1 g.

The support cube 6 is attached to a rounded support disk 5, to the concave inside surface of which a Velcro strip 4 has been glued (about 6 cm$^2$). A strip of elastic fleece 3 is placed around the leg of the runner, covering the medial ankle. The 3D acceleration sensor is simply attached to the medial ankle by means of the Velcro fastener without concern about the orientation of the support cube and thus without concern about the directions of the sensors, characterized in FIG. 5 by the directions A1, A2, and A3. The arbitrary orientation remains stable throughout the course of the motion measurement.

Figure 3:
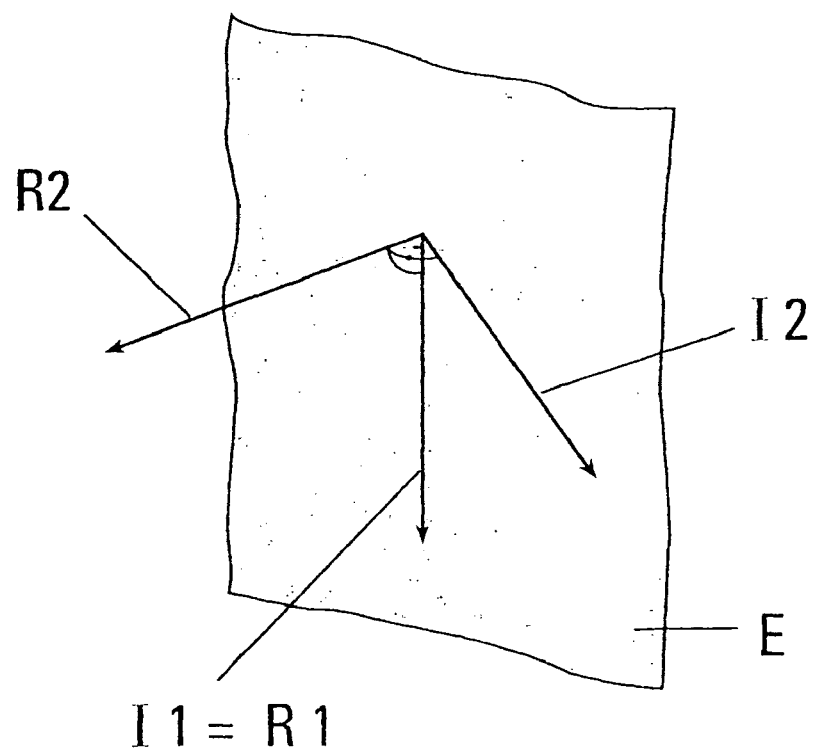
FIG. 3 shows the relationship among a first initial direction, a second initial direction and a second desired direction.

After attachment, the two initial directions are measured. Because the selected acceleration sensors can also measure static acceleration, the direction of the prevailing force of gravity is measured at rest by the device described by way of example in each of two initial positions. As the first position, a standing position was selected. The direction of the acceleration due to Earth's gravity during the first initial measurement is designated I1 in FIG. 5. The measured static accelerations (the median of 5 measurements) of the 3D acceleration sensor in the three directions A1, A2, and A3 in the first initial measurement are stored as the 3-dimensional vector Z which points in direction I1=R1 (FIG. 3).

Figure 6:
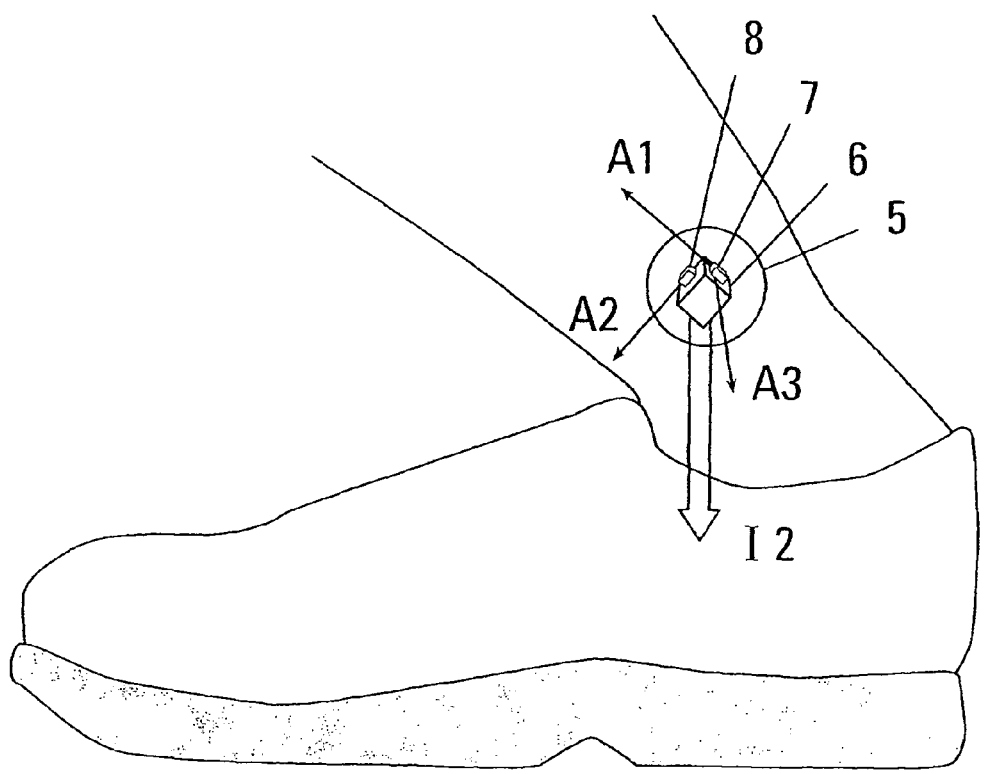
FIG. 6 is a schematic view, showing the 3D acceleration sensor of FIG. 5 in a second initial position.

The second initial direction must be different from the first. It is an essential aspect of the invention, however, that the second initial direction does not have to form a right angle to the first initial direction, even if the desired directions are supposed to be orthogonal to each other. For in practice, initial positions with initial directions which are exactly at a right angle to each other, which also specify the anatomic-physiologically desired directions, and which can also be stably maintained are very difficult to achieve. In FIG. 6, the second initial direction, namely, the direction of the force of gravity in the second initial position, is designated I2.

Figure 4:
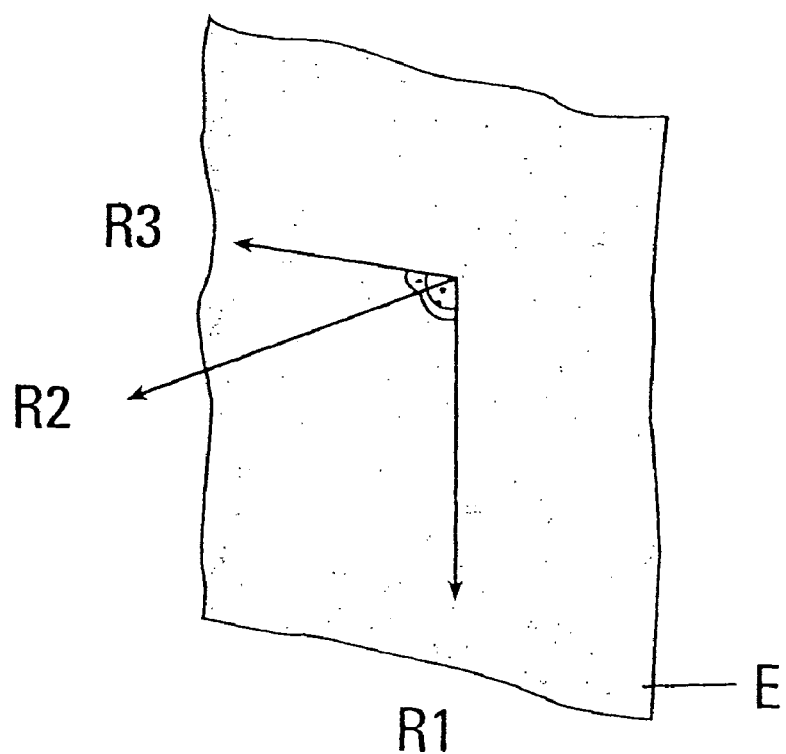
FIG. 4 shows the relationship among a first desired direction, the second desired direction and a third desired direction.
Figure 5:
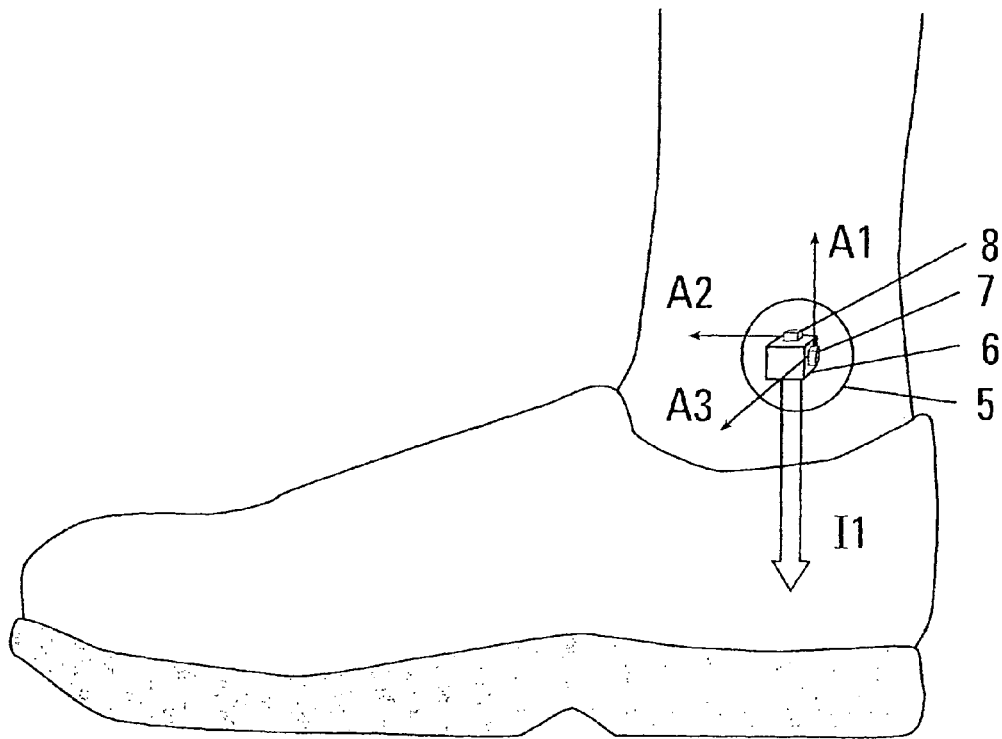
FIG. 5 is a schematic view, showing the original directions A1, A2 and A3 of a 3D acceleration sensor which is in a first initial position.

The two initial positions are selected in such a way that the plane (E in FIG. 3) defined by the first initial direction and the second initial direction contains a direction desired for the acceleration components (R3 in FIG. 4). In the case of foot measurements, it has been found that a bent knee is a good second initial position. The plane defined together with the first position is thus the sagittal plane.

The orthogonality of the desired directions, however, is ensured by a calculation process. The measured static accelerations (the median of 5 measurements) of the 3D acceleration sensor in the three directions A1, A2, and A3 in the second initial position are stored as an auxiliary vector H which points in a second initial direction I2 (FIG. 3). The vector X in the second desired direction, i.e., R2 in FIG. 3 (in the left-right direction), is obtained by means of the cross product:

$$X = Z \times H \qquad [2].$$

The cross product X of two three-dimensional vectors results in a vector which is orthogonal to the two starting vectors. The length depends on the angle of the starting vectors to each other. Because this is undetermined, the length must be normalized (e.g., by means of the scalar product, or it can be normalized to the force of gravity—see below).

The vector Y in the third desired direction, i.e., R3 in FIG. 4 (in the forward/backward direction), is determined again by means of a cross product. The orthogonality of all three desired directions to each other is therefore guaranteed:

$$Y = X \times Z \qquad [3].$$

Thus the second initial direction (I2 in FIGS. 3 and 6) does not itself correspond to one of the desired directions but rather merely enters into the calculation which determines the two other desired directions (R2, see FIG. 3, and indirectly R3, see FIG. 4). The direction R3, here a forward/backward direction, lies in a plane (E in FIG. 3), defined by the two initial directions I1 and I2 and is orthogonal to the vertical direction (I1=R1).

The length of the determined vectors X, Y, and Z in the desired directions R2, R3, and R1 is normalized to the force of gravity in the device being described here by way of example:

$$X' = X/lX \qquad [4]$$

$$Y' = Y/lY \qquad [5]$$

$$Z' = Z/lZ \qquad [6],$$

where l is the length of the vector and is calculated as the square root of the sum of the squares of the components.

The set of normalized direction vectors now serves as a basis for the transformed coordinate system:

$$B = (X', Y', Z') \qquad [7].$$

On the basis of the orthogonality of all the basic directions to each other, guaranteed by the two-fold application of the cross product, and the normalization to the unit length 1 g, the following is true for this example:

$$B^{-1} = B^T = (X', Y', Z')^T \qquad [8].$$

Figure 7:
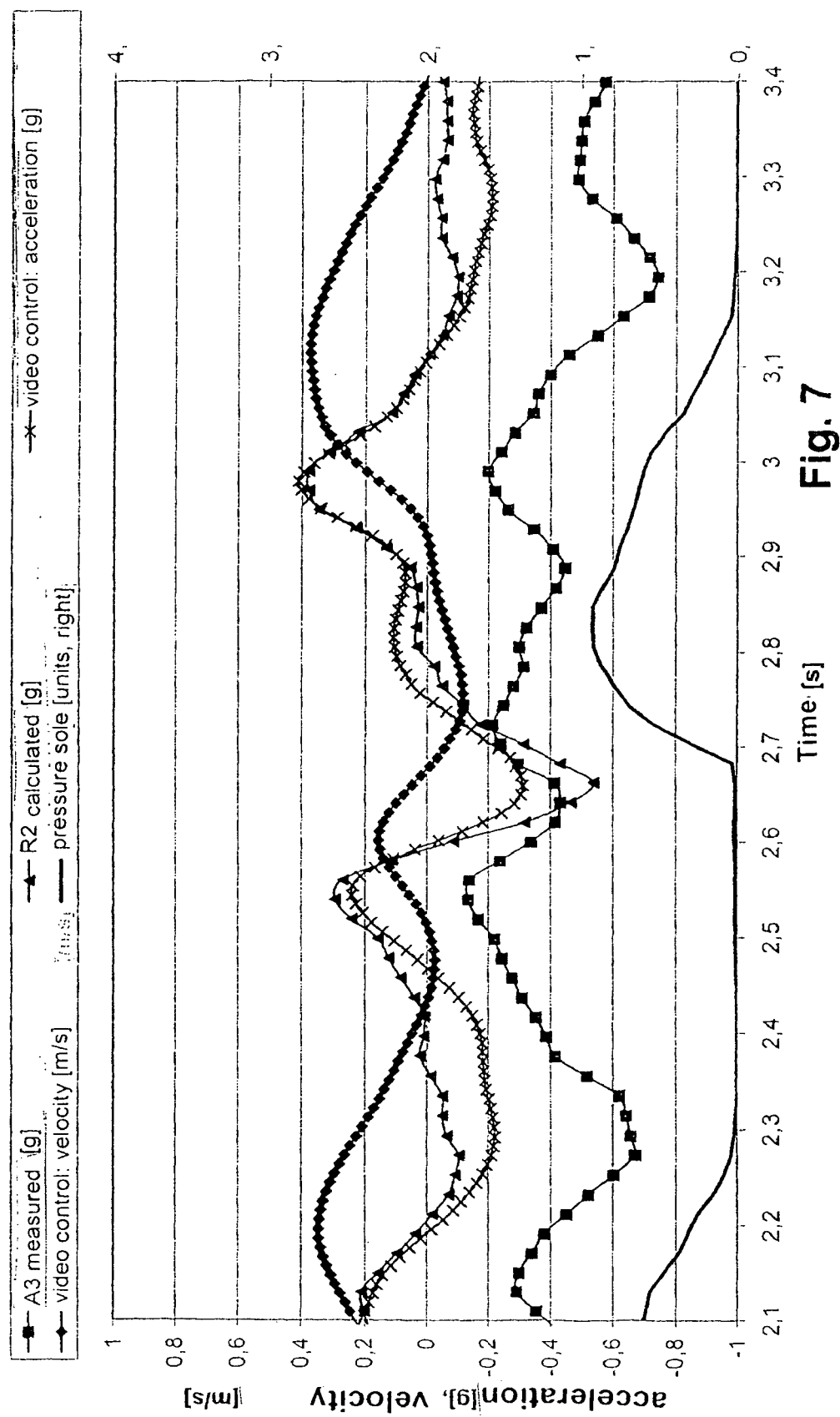
FIG. 7 is a table, showing the effect of a coordinate transformation of an embodiment of the process of the present invention.

The effect of the coordinate transformation is shown by way of example in FIG. 7. What is shown is the acceleration, obtained by two-fold differentiation, from 3D space coordinates. The acceleration was recorded by 5 infrared video cameras (video control). The acceleration values during a stride, as can be derived from the pressure measurements with a pressure transducer sole (pressure sole), were relatively low, ranging from −0.4 g to +0.4 g. At the recording frequency of 50 Hz selected here and with the mean value filter extending over 3 measurements, the accelerations in the forward/backward direction and in the vertical direction, however, were as much as 4 g and thus approximately 10 times greater (not shown). As a result, even very small deviations in the attachment of the sensors 7, 8 result in strong error signals. In FIG. 7, the measured signal at the ankle in direction A3 is shown, as well as the signal in direction R2 calculated by the method described here. Compared with the signal A3, the signal R2 calculated by coordinate transformation in the lateral direction is much more similar to the signal of the video control, because most of the falsifying effects of the vertical direction and of the forward/backward direction have been mathematically eliminated.

The use of acceleration sensors which measure the static acceleration of the force of gravity makes it possible to determine the initial directions in static initial positions. Otherwise, it would be necessary to measure initial motions (and possibly to average them over a large number of measurement values). The vertical direction can, for example, be determined by means of a short, two-legged jump in or out of a standing position; a plane containing the forward/backward direction, for example, can be determined by swinging the leg while standing. Alternatively, two motions in the horizontal plane, for example, can be measured by drawing the foot or shoe along the floor, and the vertical direction can be determined from the cross product of the two horizontal directions. The coordinate systems obtained after the transformation differ from each other when the measurements are made on hills, because, in the first case, the vertical is defined according to the force of gravity, whereas, in the second case, it is defined as normal to the horizontal plane.

Static initial positions and dynamic initial motions can also be combined. For example, the first initial direction can be determined from the direction of the force of gravity in a standing position; the second initial direction can be determined during a flat, straight run (i.e., the subject is running straight ahead on a level ground). In the case of a flat, straight run, vertical and sideways motions are cyclical and on average do not result in a change of place, whereas the forward motion does result in a change of place. The direction of acceleration signals integrated twice over the course of several strides (possibly after subtraction of the force of gravity) is, for example, defined as the second initial direction. If the force of gravity is not subtracted or not subtracted sufficiently, the measured direction will correspond not just to the forward motion but will also contain a component of the force of gravity, that is, it will assume an angle to the direction of the force of gravity of less than 90°. The plane defined by the direction of the force of gravity (first initial direction) and the direction of motion (second initial direction) contains in any case the forward direction, so that, according to the process described here including two cross product calculations, first the sideways direction and then the forward direction can always be determined orthogonally with respect to each other.

From the time change in the transformed acceleration values, it is possible, through integration, to determine the velocities in the various directions; by means of double integrations, it is possible to determine the distances traveled in the various directions; and by differentiation, it is possible to determine proportionals to the rates of force increase.

To determine the velocity at a certain point in time, the integrated acceleration signal must be set at certain times to certain velocities. This can be done by, for example, zeroing it out at certain times. A simple zeroing-out at the beginning of a measurement leads very quickly to a cumulative systematic error (drift) during the integration. This is especially critical in the case of double integration of accelerations to find the distances traveled, because even small errors in the setting of the velocity in the first drift correction lead to large errors in the distance after the second integration, because the error in the velocity is added in again during each step of the second integration.

For the described application to the lateral motion of the ankle 1, it is sufficiently accurate to say that the velocity is zero at the time of the extremum of the acceleration near the foot strike point (FIG. 7). In the measurements shown in FIG. 7, the extremum is a minimum, and the velocity in the lateral direction during pronation points in the negative direction. The time at which the velocity is zeroed out is determined on the basis of the corrected signal R2, not on the basis of the measurement signal A3.

Figure 8:
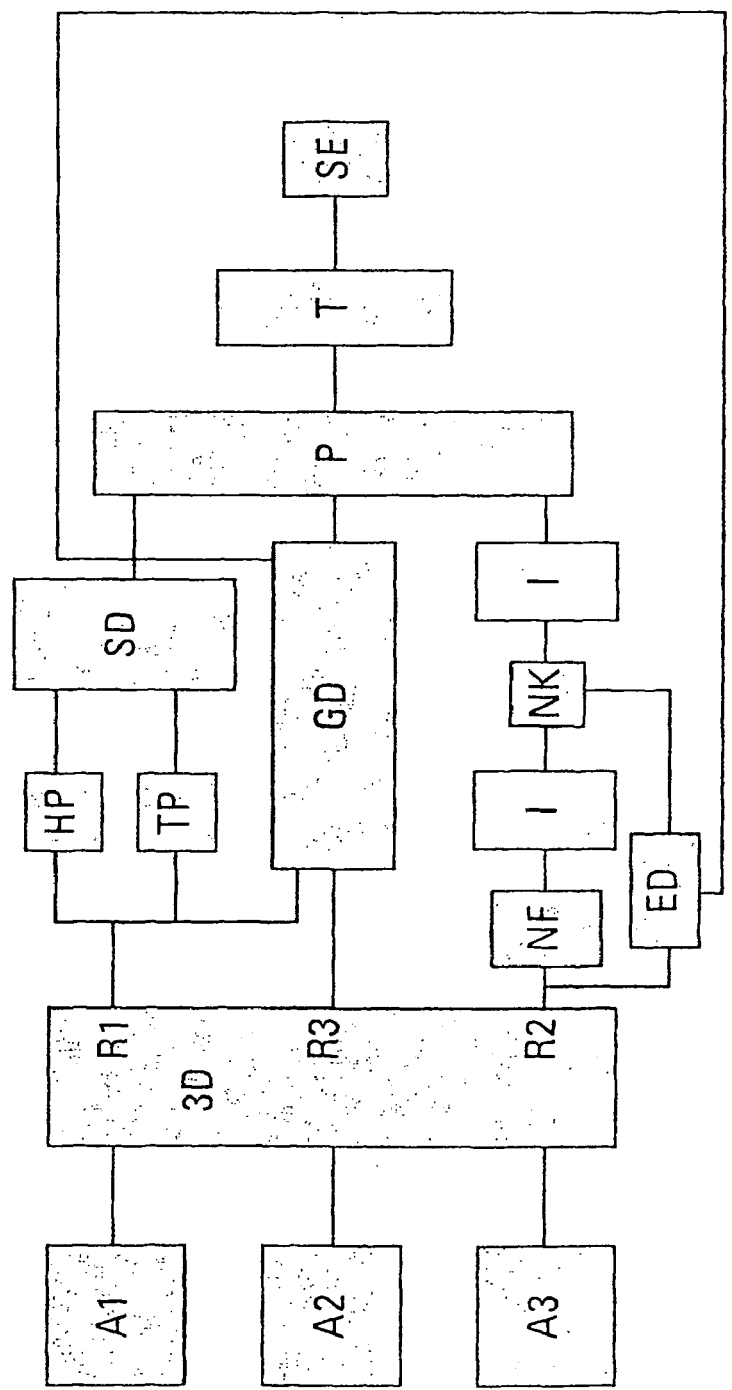
FIG. 8 schematically shows the embodiment of the process of the present invention.

FIG. 8 shows the process in schematic fashion. The acceleration values of the sensors (A1, A2, and A3) are converted by coordinate transformation (3D) to the corrected acceleration values (R1, R2, and R3). The acceleration signal in the vertical direction (R1) is sent to a stride detector (SD), which calculates the foot strike, the heel push-off, and the foot push-off, as described further below. In a preferred embodiment, the signal passes first through a high-pass filter (HP) and a low-pass filter (TP). The acceleration signals in the vertical and forward/backward direction (R1 and R3) can, if needed, be sent to a velocity detector (GD), which determines the running velocity or parameters which correlate with the running velocity, such as the duration of the stride or the duration of the standing phase. The acceleration signal in the lateral direction (R2) is filtered to zero by a zero filter (NF) before the first integration (I) in order to prevent the integration from drifting. In the zero point correction step (NK), the velocity is set to zero when the extreme value detector (ED) determines the extremum conforming to the stride. For the zero point-corrected velocity, the lateral distance (1 in FIG. 1) of the ankle is determined. The parameter detector (P) determines parameters relevant to pronation from the time curve of the lateral travel of the ankle and the stride durations taken from the stride detector (SD). The parameters can be, for example, the maximum deflection during the standing phase (maximum lateral distance) and the return from pronation during the push-off phase (difference between the maximum just mentioned and the value of the deflection during push-off). In a preferred embodiment, the parameters are corrected according to the running speed or a parameter correlated with that speed, which the velocity detector (GD) determines. From the pronation parameters, averaged over several steps, the running type (T) is determined, such as a "pronator" or a "supinator". Depending on the running type, a certain type of shoe will be suggested in the shoe recommendation (SE), such as shoe with a pronation support for pronators or a shoe without a pronation support for supinators.

In the case of short integration periods over only a few hundred milliseconds, as is the case during the standing phase of a running stride, it is typically not necessary for another drift correction. A zeroing-out for each stride is sufficiently accurate. In other cases, it can be useful, in the case of cyclic motion, to equate the average resulting motion with the drift, to distribute that in linear fashion over time, and to subtract it from the signal, as described in, for example, U.S. Pat. No. 6,513,381.

Filter functions can be used to smooth the signals, as the man of the art knows.

When accelerations and integrated functions are to be put into relationship with an external reference coordinate system, it is also possible to use additional data which measure the rotation of the 3D acceleration sensor with respect to the reference coordinate system, as described in, for example, U.S. Pat. No. 6,305,221.

Figure 9:
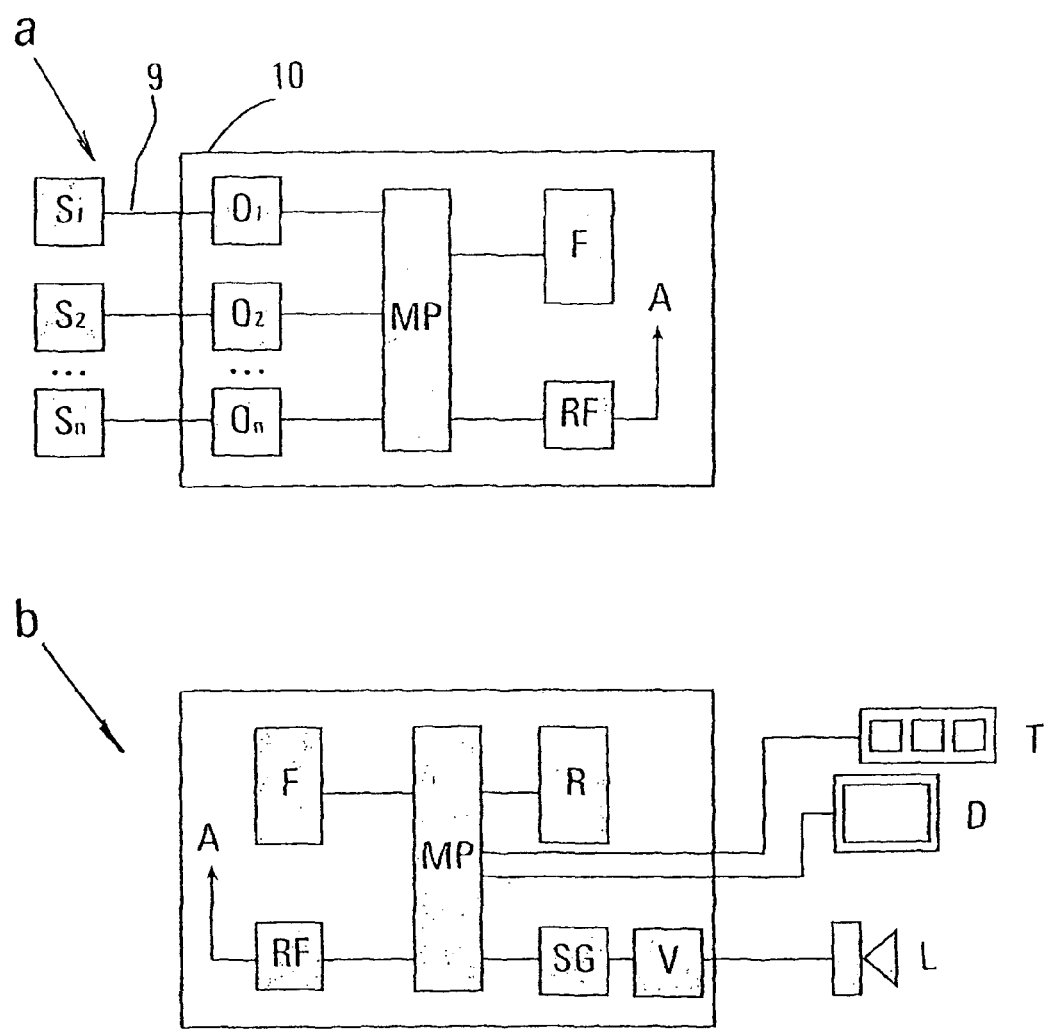
FIG. 9 schematically shows a recording unit and an output unit of another embodiment of the device of the present invention.

FIG. 9 shows by way of example a schematic diagram of the type of hardware which can be used, which is designed here in the form of two separate units, namely, a recording unit (a) and an output unit (b). In the recording unit a, the sensors (S1, S2, . . . Sn) are connected externally (by signal lines 9) to the electronic measuring circuit, which is accommodated in a cuff 10. The signals are first sent through separate op-amps (O1, O2, . . . On), and then they proceed to the inputs of the microprocessor (MP), which performs an analog/digital conversion on the input side. A flash memory (F) for intermediate storage of the data is connected to the microprocessor. Because the connection between the two units is wireless in this exemplary device, the microprocessor also has a connection to a radio module (RF) with an antenna (A).

The output unit (b) receives the data from the recording unit (a) via the antenna (A) and a radio module (RF) and feeds them to a microprocessor (MP). This is connected to a flash memory (F) and to a RAM (R). A keyboard (T) and a display unit (D) are connected so that the device can be operated and the results displayed. A sound generator (SG) is also provided, the tones of which are sent via an amplifier (V) to the loudspeaker (L). Via the loudspeaker, the device itself can guide the course of the measurements, because the stride detector can differentiate, for example, between walking and running and the can count the number of valid strides.

Figure 10:
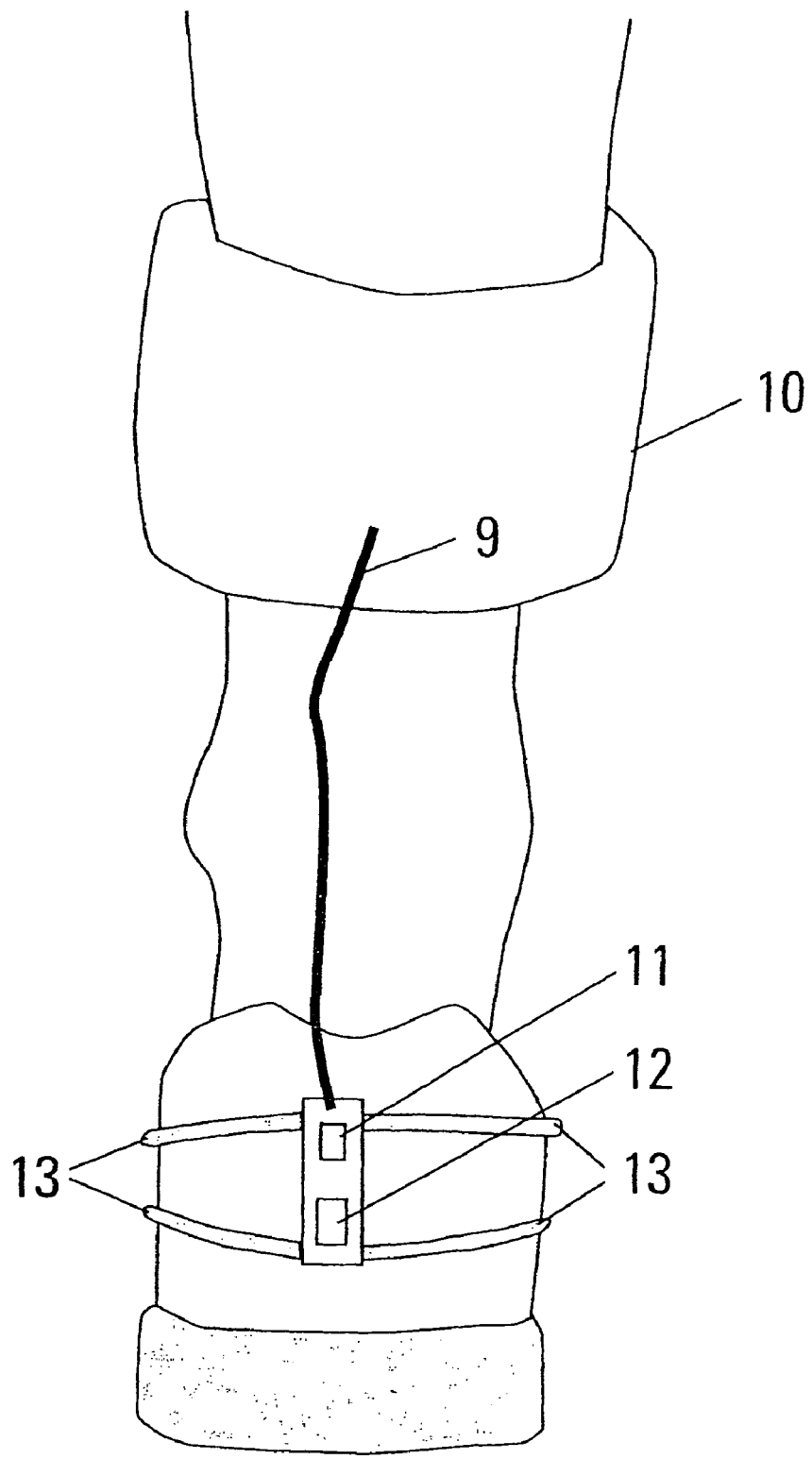
FIG. 10 shows another embodiment of the device of the present invention.

Another embodiment of the device shown in FIG. 9 is used in FIG. 10 to measure the rotation of the heel cap of the shoe. An acceleration sensor 11 and an angular velocity sensor 12 are connected electrically via cables 9 to the electronic recording circuit, which is installed in the cuff 10. The sensors are mounted on a circuit board, which is attached by rubber bands 13 to the heel cap of the shoe. The time change in the angle of the heel cap of the shoe is obtained by integration of the angular velocity measured by the sensor 12.

The acceleration sensor is attached in such a way that it supplies the vertical signal with satisfactory accuracy. A 3D acceleration sensor with coordinate transformation is usually not necessary, because the vertical signal itself is still recorded with 90% accuracy even when the acceleration sensor is attached with a 25° deviation from the vertical. In the following, without limitation of general applicability, it will be assumed that a vertical acceleration has a positive direction as a result of the decrease in the velocity of descent caused by the braking impact when the foot strikes the ground. The static acceleration due to gravity also acts in a positive direction.

Figure 11:
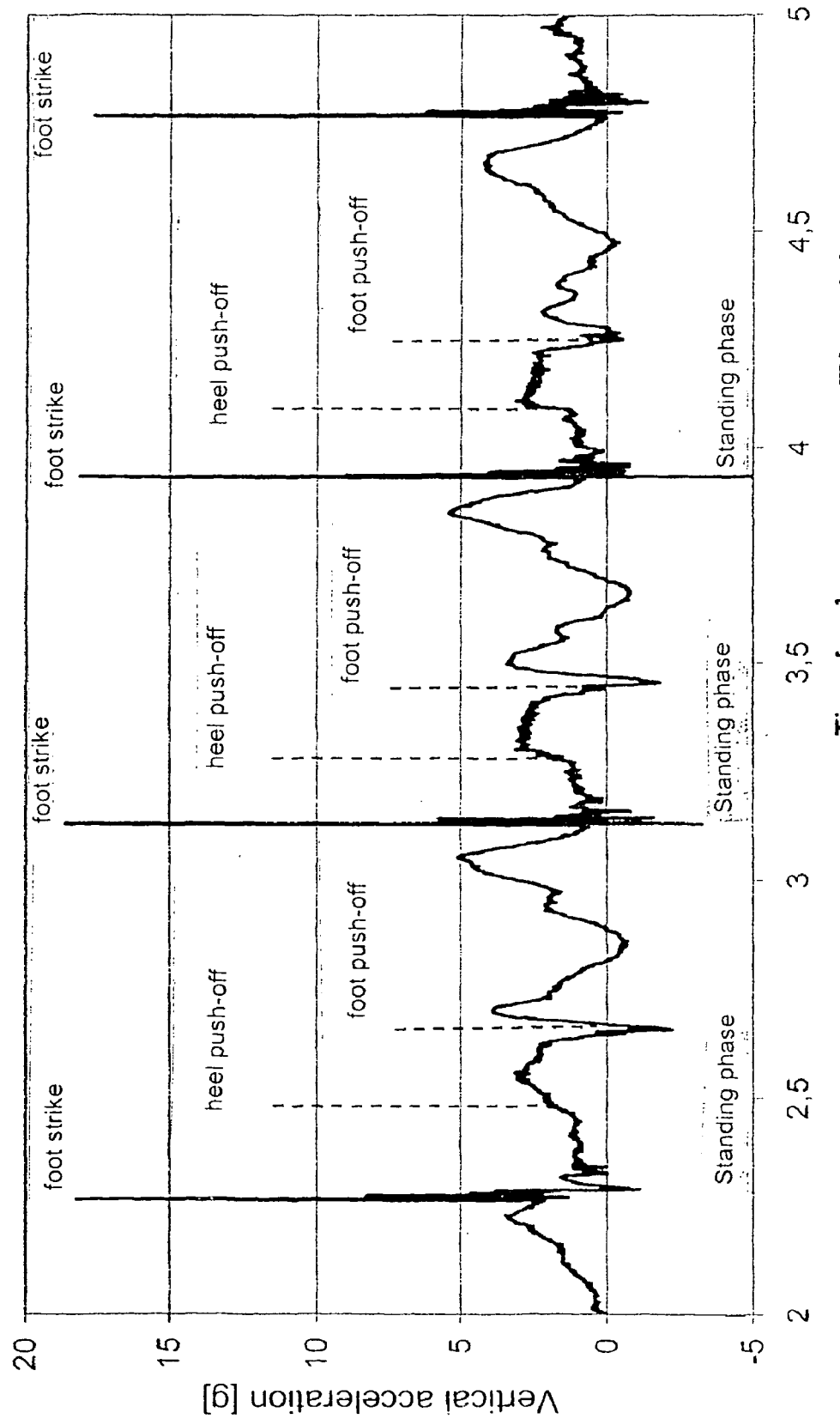
FIG. 11 shows converted motion signals representing foot strikes.

The acceleration signal, which is obtained with satisfactory accuracy in the vertical direction, is analyzed to detect certain general features of a stride (FIG. 11). On the basis of the detected features of the stride, the angular velocity signal and/or the signal of the time change in the angle obtained by integration is evaluated. The following values were recorded with hardware, selected by way of example, which records at a measurement frequency of 400 Hz.

In a preferred embodiment, the foot strike is detected (FIG. 11). The foot strike is detected, for example, by determination of when the sufficiently vertical acceleration signal exceeds a certain threshold (e.g., 10 g). In a more preferred embodiment, the threshold is adaptive; that is, the threshold is adjusted after a few strides in correspondence with the maximum signals so that it lies within a certain "corridor" (e.g., 4-12 g). For this adaptive threshold determination, a low value of 4 g, for example, is used to start with. Then, each time a signal exceeding the threshold is received, half of the maximum value above 4 g is averaged with the previous threshold, i.e., with 4 g at the beginning, to obtain the new threshold. If the first peak, for example, shows a maximum of 18 g, that is, 14 g above the initial threshold, half of the amount above 4 g, that is, 7 g, is added to the initial threshold of 4 g, giving 11 g. The average is therefore 7.5 g as the new threshold. If the following maximum is, for example, 19 g, the threshold increases to 9.5 g (average of 7.5 g and 11.5 g). If the third maximum is, for example, 10 g and therefore only just barely above the threshold, the adaptive threshold decreases again (to 8.25 g, the average of 9.5 g and 7 g). The threshold detector can preferably identify threshold values both in the positive and in the negative direction. In a preferred embodiment, the sufficiently vertical acceleration signal is first sent through a high-pass filter.

In a preferred embodiment, the heel push-off is recognized (FIG. 11). The heel push-off is recognized, for example, by determining when the sufficiently vertical acceleration signal rises and exceeds a certain threshold, either absolute (for example, 2 g) or relative, within a defined time span after foot strike. In a more preferred embodiment, the sufficiently vertical acceleration signal is first passed through a low-pass filter.

In a preferred embodiment, foot push-off is recognized (FIG. 11). The foot push-off is recognized, for example, in that, within a defined time span (for example, in 0.15-0.9 s) after foot strike and/or some other defined time interval after heel push-off, the sufficiently vertical acceleration signal falls below a threshold, absolute or relative (for example, a decrease by 2 g). In a more preferred embodiment, the sufficiently vertical acceleration signal is first sent through a low-pass filter.

In a preferred embodiment, the angular velocity signal is processed together with the signal from the acceleration sensors, in particular by a combination of the previously mentioned features. For example, the standing phase is defined as the time between foot strike and foot push-off, and the point in time can be set at the time when a certain percentage of the standing phase has passed (for example, the integral between 10% and 25% of the standing phase). Alternatively, a smaller percentage can be put into relationship with the entire length of the stride obtained from two successive foot strike points.

Figure 12:
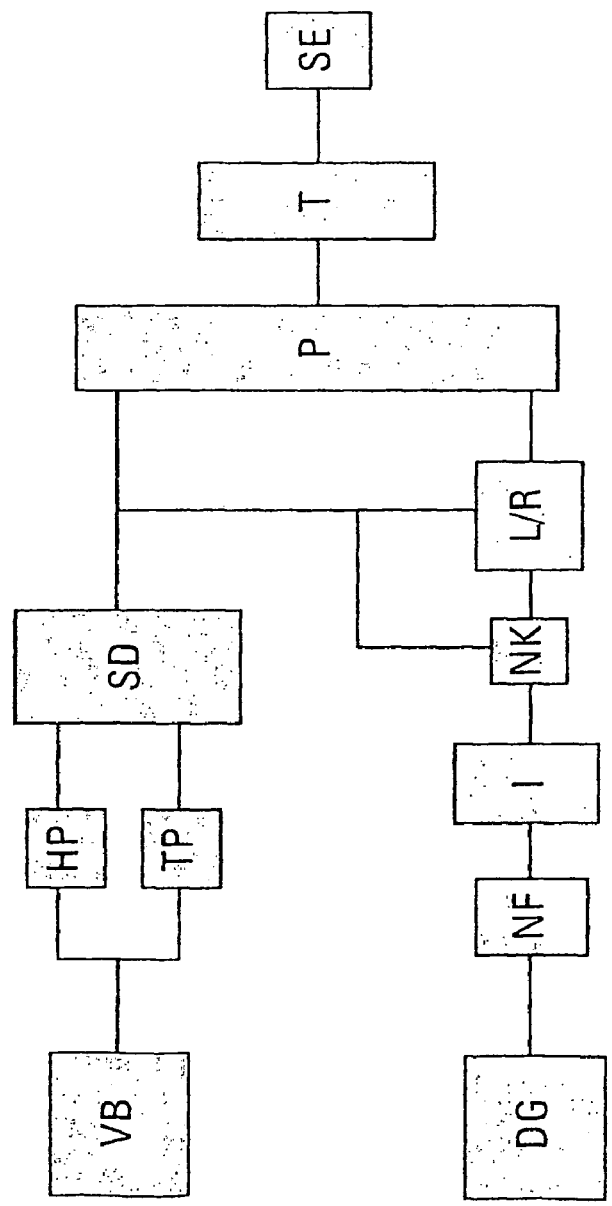
FIG. 12 schematically shows the overall process for generating the motion signals of FIG. 11.

FIG. 12 shows the overall process in schematic form. The vertical acceleration (VB) is sent to a stride detector (SD), preferably by way of a high-pass filter (HP) and a low-pass filter (TP). The detector calculates foot strike, heel push-off, and foot push-off on the basis of characteristic patterns, as described above. The angular velocity signal (DG) can be sent to a zero filter (NF) before integration (I) to prevent long-term drift of the integration. In the case of short integration times lasting only a few hundred milliseconds, as is the case during the standing phase of a running stride, however, a drift correction of this type is typically not necessary. In the zero-value correction step (NK), the angle can be set to zero on or at certain points, as will be described further below. The signal is subjected to left/right correction, because the pronation angles have opposite signs on the two sides. The parameter detector (P) uses the time change in the angle and the stride times from the stride detector (SD) to calculate parameters relevant to pronation, such as the integral of the angular velocity over 20% to 60% of the standing phase. In a preferred embodiment, the integration limits depend on parameters which are derived from the signal of the acceleration sensor 11 and/or from the signal of an acceleration sensor in the cuff 10, as will be described below. A pronation parameter is preferably calculated from several subparameters, including, for example, not only the previously mentioned partial integral but also the maximum angular velocity. The running type (T) is determined from the pronation parameters, averaged over several strides. For a "pronator", the values for the partial integral will be high, whereas for a "supinator" the values for the partial integral will be low. Depending on the running type, a type of shoe will be suggested in the shoe recommendation (SE), for example, a shoe with a pronation support for pronators or a shoe without a pronation support for supinators (FIG. 13a to 13d).

In a preferred embodiment, the device (FIG. 9) is used with additional sensors. In a preferred embodiment, another acceleration sensor is installed in the cuff 10 in addition to the acceleration sensor 11 and the rotational speed sensor 12 on the heel cap (FIG. 10). This additional sensor measures the time change in the vertical acceleration at the leg. FIG. 14a shows the angular velocity as measured by the rotational speed sensor 12, from which the angular load (for example, the partial integral from 10% to 25% of the standing phase, averaged over all the strides) is calculated. The standing phases (plus approximately the preceding 15 ms) of several strides are superimposed; the foot strike and the foot push-off were calculated from the acceleration sensor 11 on the heel cap, as described above. FIG. 14b shows the time change in the vertical acceleration on the leg. The standing phases (plus approximately the preceding 15 ms) of several strides are superimposed; the foot strike and the foot push-off were calculated from the acceleration sensor sensor on the heel cap 11, as described above. The average rate of increase was calculated from the maximum and the time difference between the maximum and the foot strike (calculated from the acceleration sensor on the heel cap 11, as described above), and this rate is interpreted as a feature of the impact load.

Figure 15:
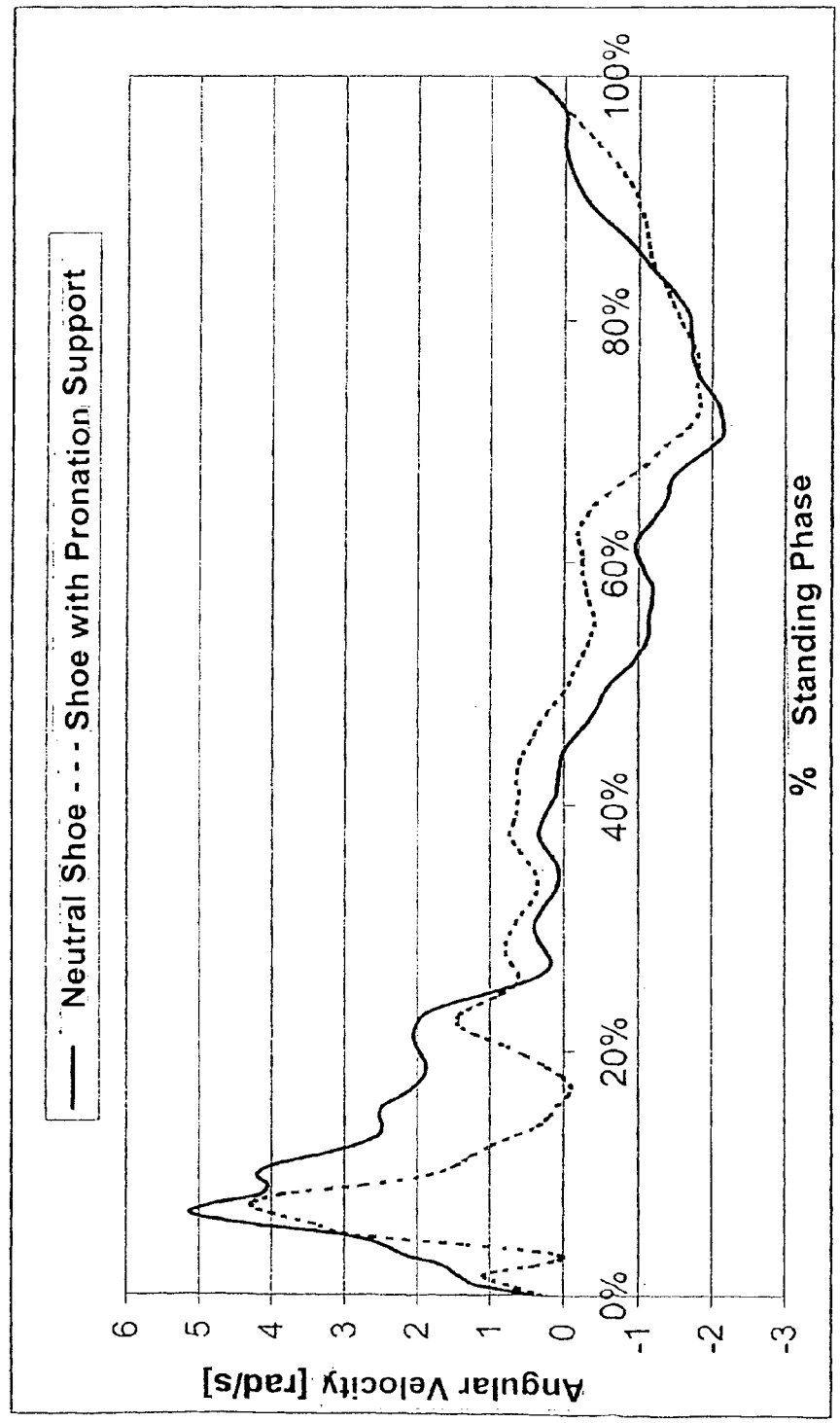
FIG. 15 shows a comparison between the angular velocity of a neutral shoe and the angular velocity of a shoe with a pronation support.

In a preferred embodiment, the device serves to compare shoes. For example, the effect of a pronation support can be measured by determining the degree to which the above-mentioned parameter, namely, the angular load, has decreased. FIG. 15 shows a comparison between the angular velocity, averaged over several strides, of a neutral shoe and the angular velocity of a shoe with pronation support. In the range of 10-25% of the standing phase, the angular velocity is clearly lower in the case of the shoe with the pronation support. The device can also compare used shoes with new shoes in order to examine the used shoe for signs of wear, for example. In a preferred version, the data for the runner in his new shoe are stored, so that they can be compared later with the values obtained for the used shoe. In an even more preferred version, the data are stored on a chip card, which the runner is given as a "shoe ID" and which can be used to perform a shoe check at any measuring station equipped with a chip card reader. In the most preferred version, the data for the runner with the new shoe are stored in a chip by a wireless read/write method (RFID). The chip can then be attached permanently to the shoe or permanently built into the shoe.

Figure 16:
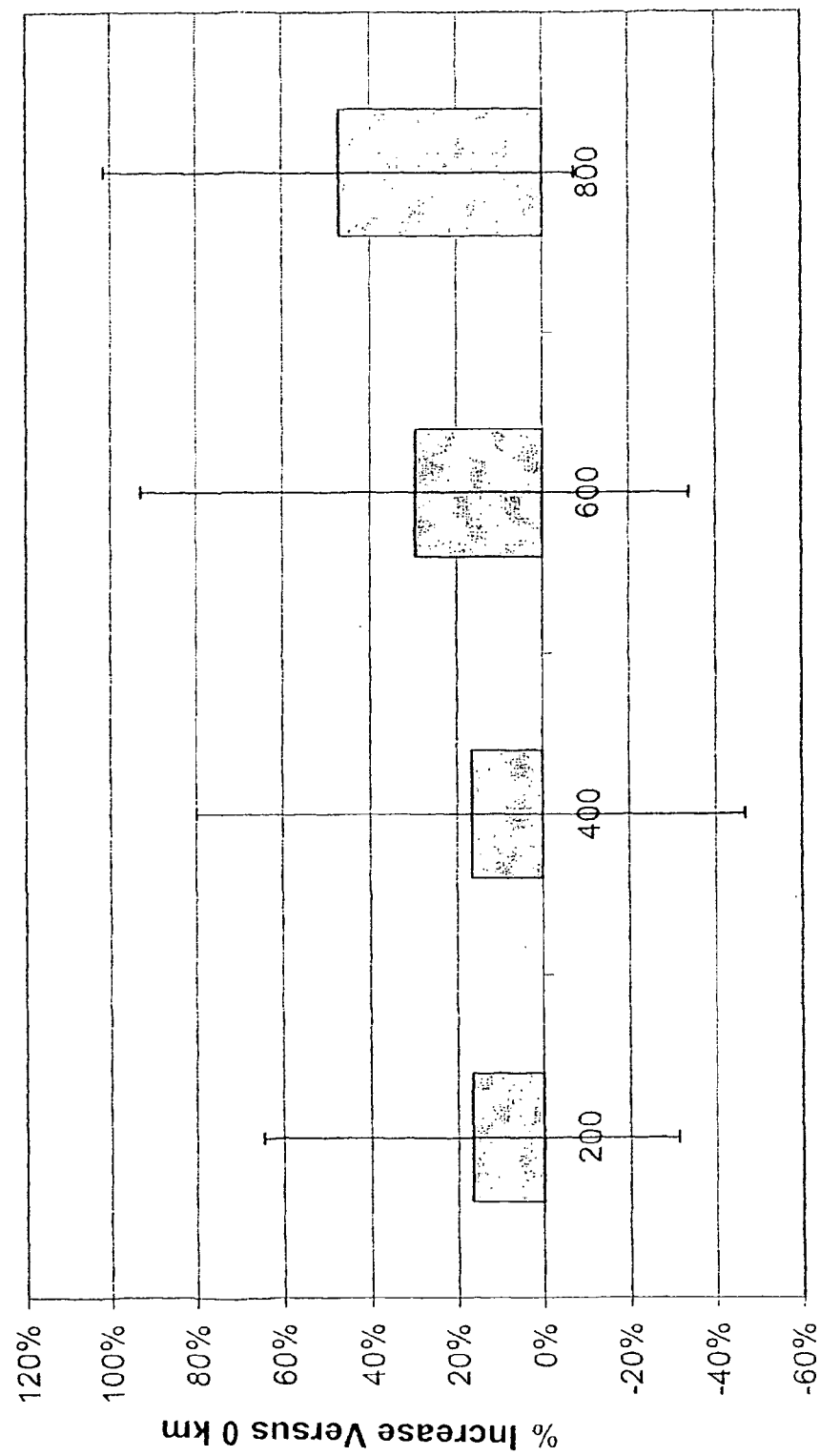
FIG. 16 shows the aging phenomena of running shoes.

FIG. 16 shows the aging phenomena of running shoes averaged over twenty different runners. The maximum angular velocity averaged over several strides was measured, and the value was stored in the new shoe as a reference value. On the basis of the average duration of the standing phase supplied by the velocity detector (GD), the values after running distances of 200, 400, 600, and 800 km were normalized to the average duration of the standing phase of the reference run at 0 km in order to balance out the different running speeds.

For example, in the case of a standing phase which was 10% longer, the maximum angular velocity was increased by 10% before comparison with the reference value at 0 km. The increase beyond the initial plateau of about 18% starting at about 500 km is a feature of an aging shoe.

Figures 17A, 17B, 17C:
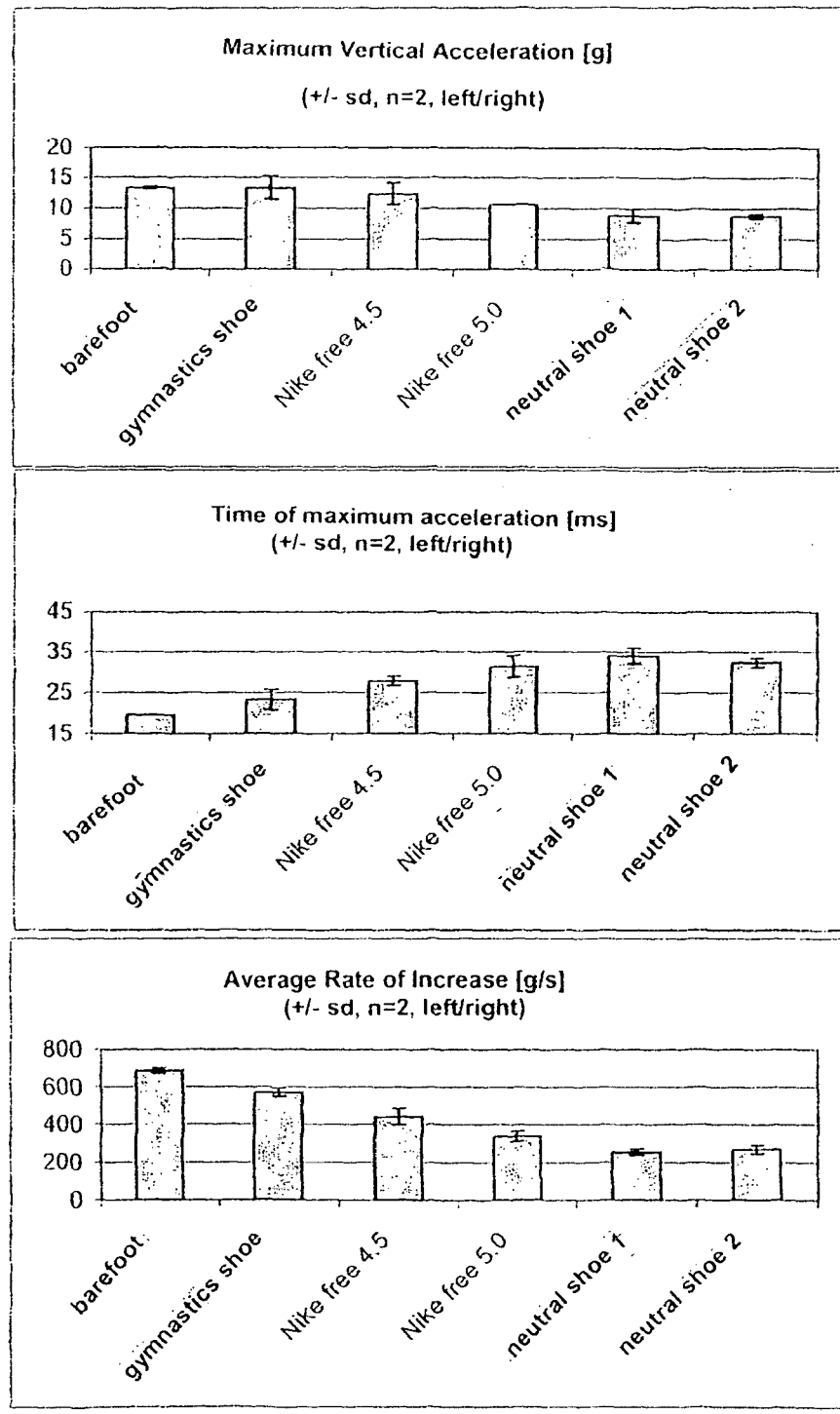
FIGS. 17a to 17c are graphs showing the measurement of the vertical acceleration at a leg of a person as measured by an acceleration sensor attached to the leg.

In another embodiment, the device is used to measure and to evaluate shoe inserts. FIGS. 17a to 17c shows the measurement of the vertical acceleration at the leg, measured by the previously described acceleration sensor in the cuff 10. Two neutral shoes from different manufacturers were compared with the "Nike Free" shoe with two different inserts, "4.5" and "5.0", with a gymnastics shoe with an undamped rubber sole, and with the bare foot without socks, all on hard ground. FIG. 17a shows the maximum vertical acceleration in g at the leg. FIG. 17b shows the time difference between the first strike, detected by the previously mentioned threshold detectors on the basis of the signal of the acceleration sensor 11 at the heel cap or at the heel in the case of the barefoot runner, and the time of the maximum vertical acceleration at the leg. FIG. 17c shows the quotient of the maximum vertical acceleration over the time difference, thus giving the average rate of increase in g/s. From the combination of the signals from the two acceleration sensors, it is possible, using the time difference and the average rate of increase, to determine parameters which make it possible to arrive at a much better differentiation between the various situations, i.e., the neutral shoe, the Nike Free shoe with various inserts, the gymnastics shoe, and the bare foot.

Figure 18A:
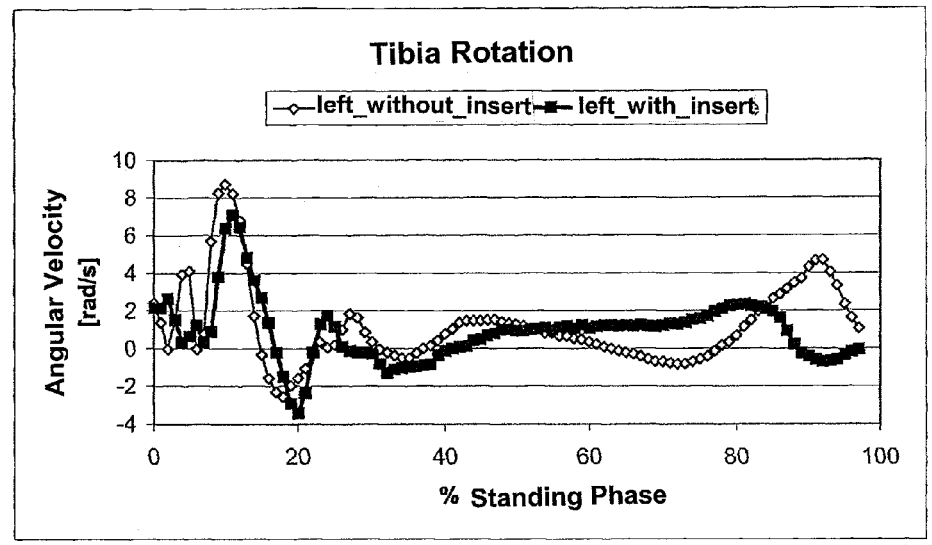
FIG. 18a shows the measurement of the angular velocity of the tibia rotation of a person without a special shoe insert.
Figure 18B:
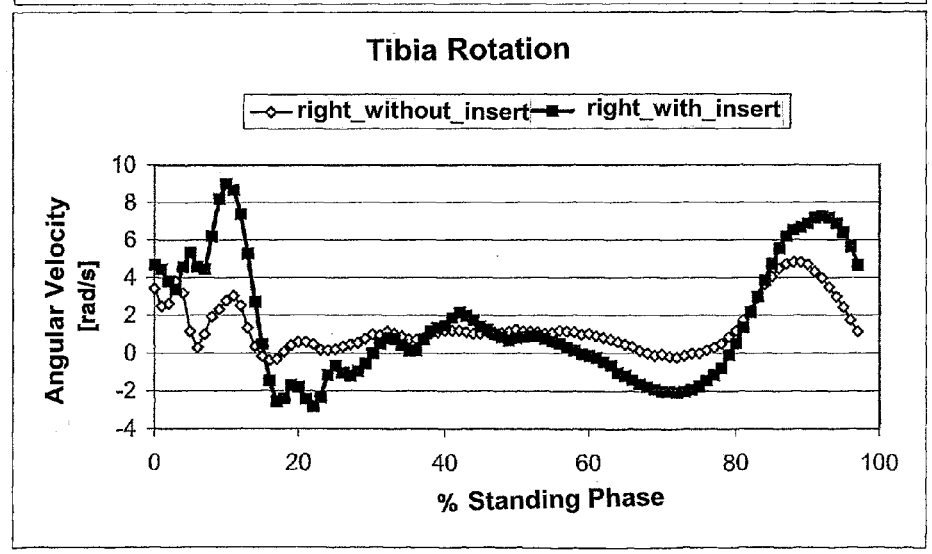
FIG. 18b shows the measurement of the angular velocity of the tibia rotation of the person with a special shoe insert.

In another preferred embodiment, a second rotational speed sensor is incorporated into the cuff 10 as an additional sensor, so that the rotation of the tibia around its longitudinal axis (tibia rotation) can be measured (3 in FIG. 1b). FIGS. 18a and 18b show the measurement of the angular velocity of the tibia rotation of a person without a special shoe insert (on the left side) and with a special insert (on the right side). The measurement curves on the left and right become much more similar to each other as a result of these inserts; that is, the difference in the running style between right and left is reduced.

The rotational speed sensor supplies the angular velocity over time as its output signal. So that the change in the angle can be calculated from this information, the signal must be integrated. Once the measuring frequency and the reference angle are known, the time change in the angle can be calculated with satisfactory precision. The measuring frequency is determined by the system itself and is thus known. To keep the integration error sufficiently small, a new reference angle must be determined for each stride cycle. A simple zeroing-out at the beginning of a measurement leads very quickly to considerable cumulative systematic error (drift) during the integration and is not sufficient.

U.S. Pat. No. 6,513,381 points explicitly to the drift problem and describes a method for correcting the acceleration data for drift so that running speeds and distances traveled can be calculated. It is also proposed that an angular acceleration be determined by means of the difference between two acceleration sensors arranged parallel to each other a certain distance apart and to obtain angle values for the pronation angle measurement by means of two-fold integration. This suffers from the disadvantage, however, that, to avoid drift, both the angular velocity from the first integration and the angle from the second integration must be set repeatedly to certain values. In addition, errors in the setting of the angular velocity for the first drift correction lead to errors in the time change in the angle after the second integration, errors which cannot be corrected by occasionally setting the angle to an absolute value. Thus a twice-integrated signal derived from the angular accelerations during pronation measurements drifts away very quickly, because no general point in time exists at which the angular velocity can be set with sufficient accuracy to a defined value (e.g., zero).

Although U.S. Pat. No. 6,513,381 suggests that angular velocity meters be used to measure angles by simple integration and that drift be corrected by the setting of the angle, the proposed method of setting the angle at each foot strike is completely unsuitable, because the angle of the shoe 2 with respect to the vertical is extremely variable at this point in time.

There are various methods which can be used to determine the angular position of an rotational speed sensor.

In the following, a solution to the problem of expressing the angle is proposed which is based on using angular velocity meters to measure the angle by simple integration and to correct the angle 2 at each step, where the angle is defined at variable times and the time of its setting is obtained from the signal of a different motion sensor. In particular, a device is proposed (FIG. 10), which, in addition to the angular velocity meter 12, has an acceleration sensor 11 attached to the shoe, so that, from the acceleration signal, a point in time is determined at which the angle 2 of the shoe is set to zero.

The acceleration signal, which is obtained with sufficient accuracy in the vertical direction, is analyzed to identify certain general features of a stride (FIG. 11). On the basis of the identified features of the stride, the integrated angle signal is then set to certain angles (e.g., zero) at certain points.

In a preferred embodiment, the time at which the angle is set is calculated by a combination of the above-mentioned features, namely, foot strike, heel push-off, and foot push-off. For example, the standing phase is defined as the period of time between foot strike and foot push-off, and the time can be set at the point when a certain percentage of the standing phase has passed (FIG. 11). Alternatively, a smaller percentage can be put into relationship with the entire stride length obtained from two successive foot strikes.

Figure 19:
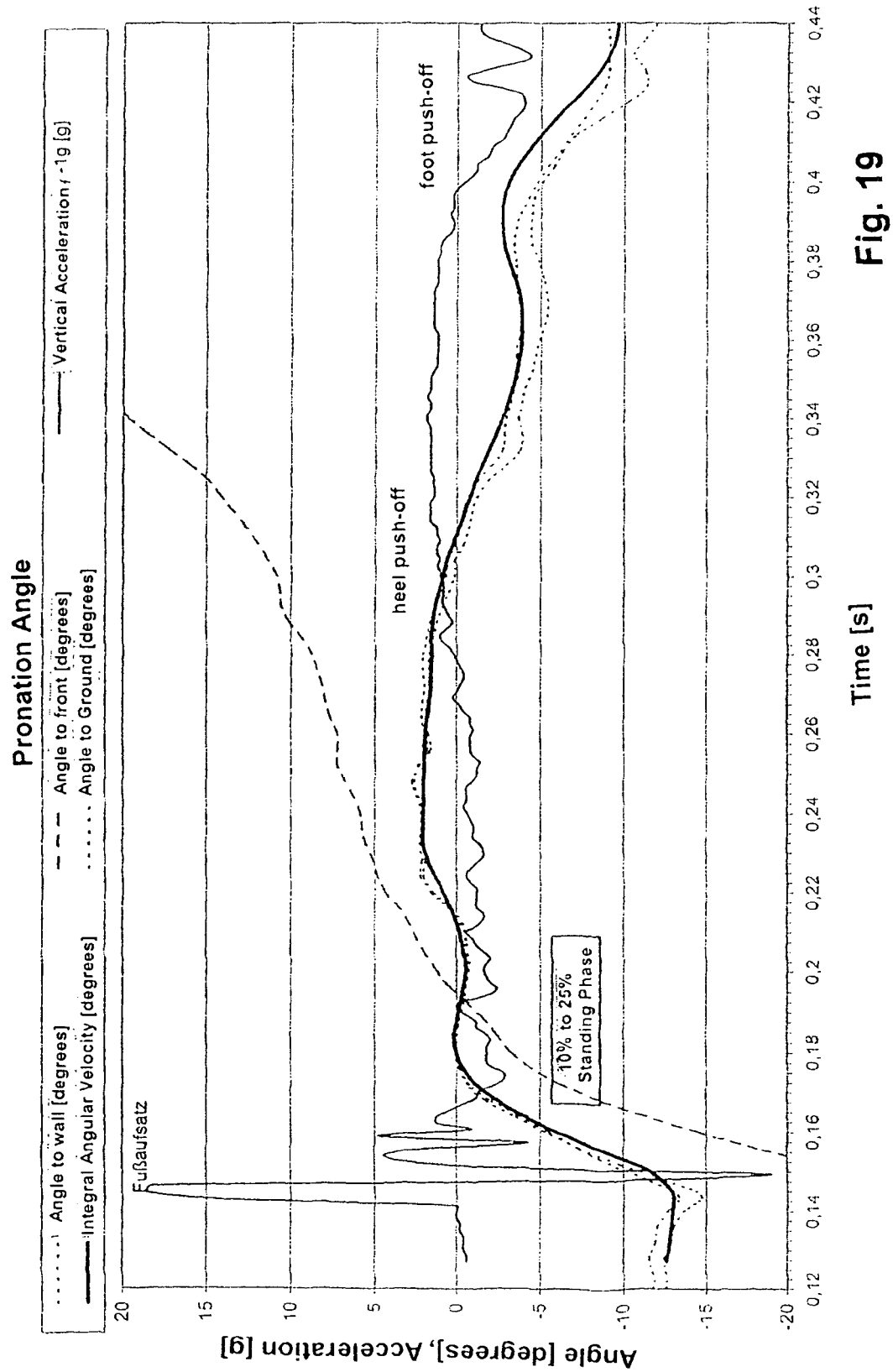
FIG. 19 is a person's running stride chart as measured by an acceleration sensor and a rotational angle sensor which are attached to the heel cap of the shoe of the person.

In a preferred embodiment, the percentage of the standing phase or stride length is varied as a function of the sufficiently vertical acceleration signal. In a preferred embodiment, a constant value is subtracted from the sufficiently vertical acceleration signal (e.g., 1 g), and then the center of pressure of the negative signal component is calculated within a certain range. The range can be related to a percentage of the standing phase or of the stride length; for example, the range can be 10-25% of the standing phase. The time at which the center of pressure of the negative signal within the given range occurs usually deviates only slightly from the time at which the shoe is straight up, that is, the time at which the angle 2 is zero. FIG. 19 shows a running stride, for which a circuit board with the acceleration sensor 11 and rotational angle sensor 12 was attached to the heel cap. Markers were also provided on the heel cap so that the space coordinates could be identified by means of five IR cameras. From the position of the markers in space, the angle of the heel cap was calculated in three planes of projection: During the standing phase, the projection to the side wall (angle to wall) and the projection to the floor (angle to floor) correspond to the rotation in the pronation direction 2, whereas the projection to the front wall (angle to front) corresponds to the rotation in the sagittal plane. The vertical acceleration was obtained from the sensor 11. The change in the angle was obtained by integration from the rotational speed sensor 12, and after subtraction of 1 g, the angle was zeroed out at the time the center of pressure of the negative component of the vertical acceleration occurred. The zero point agrees with sufficient accuracy with the zero point of the pronation angle determined from the 3D video analysis of various runners. The angle at the time of foot strike, however, is usually strongly negative (−13° in FIG. 19) and highly variable from stride to stride.

In another preferred embodiment, a later point in the time during the standing phase is used for zeroing-out. When a runner is running, push-off from the standing phase into the swing phase usually occurs by way of the MTC1 (capitulum of the first metatarsal). The time of push-off is determined by the change in the signal of the acceleration sensor at the heel cap of the shoe and characterizes the end of the standing phase (100%). If the foot was previously in a pronated position, then there will be considerable rotational movement back in the supination direction and vice versa. The change in the angle just before push-off is therefore an important factor in differentiating between supinators and overpronators. If the angle is set to zero in this range (80-85% of the standing phase), the change in the angle can be determined with a resolution of a few degrees.

In another preferred embodiment, an additional sensor is used to measure the change in the center of pressure (COP) under the heel. The COP is the center of the pressure distribution under the sole of the foot. It changes with the pronating movement. The position is measured only in the mediolateral direction under the heel during the initial pronation. The reference position or angle is determined by a measurement in the standing position. By comparison with the COP measurement during the running process, the time is determined at which the heel cap assumes the reference angle.

In a preferred embodiment, the COP measurement is conducted by an FSR linear potentiometer. FSR (force-sensing resistor) sensors are thin and flexible. They change their electrical resistance as a function of the force being exerted on their active surface. FSR linear potentiometers make it possible not only to measure the pressure but also to determine the location at which the pressure is introduced. The spatial resolution is less than 1 mm. If the pressure is introduced simultaneously at several locations, the indicated position corresponds to the COP of the active force. The FSR linear potentiometer is attached under the heel in such a way that it is transverse to the running direction and thus allows a 1-dimensional determination of the COP during initial pronation. In an concrete embodiment, the FSR potentiometer is carried in a special measuring sock, which the test subject has previously put on.

In a different preferred embodiment, the contact of the sole of the shoe with the ground is used to determine an angle during each stride. What is determined is the time at which one or more parts of the sole are in contact with the ground. This time is used as a fixed reference point for the angle calculation. For this purpose, a switch or pressure transducer is attached underneath the sole in such a way that it reacts on contact with the ground. A flat film switch attached to the center line of the sole behind and under the heel is a suitable type of switch. The switch supplies a signal precisely as long as the rear heel area of the sole, during the initial pronation phase, is in full contact with the ground (middle position). Better spatial resolution can be achieved by means of thin pressure transducers, which can determine the middle position on the basis of the time at which maximum pressure is detected. FSR sensors, for example, are suitable for this. They are attached to the centerline in the heel area in a manner similar to the switches.

In another preferred embodiment, the distance between the sole or heel cap and the ground is used to determine an angle during each stride. Sensors which measure the distance between the measurement point and the ground are used for this purpose. These measurement points can be connected to the shoe or connected directly to the position of the rotational angle sensor or its holder. The distance can be measured by optical or capacitive means. From this absolute distance measurement, it is then possible to determine the relative position by comparison of several measurement points with each other.

The position of the sole or heel cap with respect to the ground is determined on the basis of when the measurement values in the reference position reach a maximum or a minimum. In a preferred embodiment, this is achieved by installing a photosensor at one end of a narrow tube, while the other end points to the ground. A minimum is reached when the tube is vertical and is the shortest distance away from the ground.

In another preferred embodiment, the capacitance between a measuring surface and the ground is determined. This value reaches a maximum when the surface is parallel to the ground at a given distance. Two separate sensor surfaces can also be used, which, for example, are attached to the inner and outer sides of the shoe or sensor holder (of sensors 11 and 12).

When the foot strikes the ground, first the outer and then the inner capacitance is affected. The position of the sole of the shoe can then be determined from the ratio between these two values.

In another preferred embodiment, the position is determined by means of the Earth's magnetic field. The field is detected and evaluated by means of a 3D sensor.

What is claimed is:

1. A process for evaluating motion signals in three-dimensional space by using at least one acceleration sensor and using a rotational angle sensor or speed sensor, the process comprising the steps of
    obtaining a first initial measurement value using the at least one acceleration sensor in a first initial direction in space, the first initial measurement value being a first determined value, the first initial direction being a first direction in space;
    obtaining a second initial measurement value in a second initial direction in space using the at least one acceleration sensor, the second initial direction being different from the first initial direction;
    calculating, by a processor, a second direction in space and a second determined value from the first initial measurement value and the second initial measurement value, the second direction being different from each of the first initial direction and the second initial direction;
    calculating, by the processor, a third direction in space and a third determined value from the first initial measurement value and the second determined value, the third direction being different from each of the first direction and the second desired direction;
    converting, by a processor, values measured by the at least one acceleration sensor and a rotational angle sensor or speed sensor into a first acceleration value in the first direction, a second acceleration value in the second direction and a third acceleration value in the third direction;
    detecting motion using the at least one acceleration sensor and the rotational angle sensor or the speed sensor to obtain the measurement values; and
    processing measurement values of the at least one acceleration sensor so that a resulting calculated signal corresponding to a specific direction is evaluated,
    wherein the step of detecting motion comprises determining a beginning time and an ending time from the calculated signal, and evaluating a measurement value of the at least one rotational angle sensor or speed sensor between the beginning time and the ending time.

2. The process of claim 1, wherein the second direction is normal to each of the first initial direction and the second initial direction.

3. The process of claim 1, wherein the specific direction predominately corresponds to a vertical direction.

4. The process of claim 1, wherein the at least one acceleration sensor measures accelerations in three orthogonal directions, the process further comprising the step of processing measurement values of the three orthogonal directions so that a resulting calculated signal corresponding to the specific direction is evaluated.

5. The process of claim 1, wherein the beginning time and the end time are detected using adaptive thresholds.

6. The process of claim 1, wherein a foot strike is measured based on acceleration signals measured during a gait cycle.

7. The process of claim 1, further comprising evaluating measurement values of the rotational angle sensor or speed sensor corresponding to a pronation speed of a foot.

8. The process of claim 1, further comprising evaluating measurement values of the rotational angle sensor or speed sensor corresponding to a rotation of a lower limb of a subject about a longitudinal axis of the lower limb.

9. The process of claim 1, further comprising evaluating, by the processor, a performance of shoes during running based on the step of detecting motion.

10. The process of claim 2, wherein the third direction is normal to each of the first direction and the second direction.

11. The process of claim 9, wherein the process is performed using worn shoes and new shoes and further comprises evaluating, by the processor, a function wear of shoes by comparing measurements obtained for the worn shoes with measurements obtained for the new shoes.

12. The process of claim 9, further comprising normalizing, by the processor, the values of the rotational speed sensor for running speed.

13. The process of claim 9, wherein evaluating a performance of shoes comprises evaluating a performance of shoe inserts.

* * * * *